US009692607B2

(12) United States Patent
Tamura

(10) Patent No.: US 9,692,607 B2
(45) Date of Patent: Jun. 27, 2017

(54) COMMUNICATION TERMINAL, COMMUNICATION MANAGEMENT SYSTEM, COMMUNICATION MANAGEMENT METHOD, RECORDING MEDIUM STORING COMMUNICATION MANAGEMENT PROGRAM

(71) Applicant: Hideki Tamura, Kanagawa (JP)

(72) Inventor: Hideki Tamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 323 days.

(21) Appl. No.: 14/264,577

(22) Filed: Apr. 29, 2014

(65) Prior Publication Data

US 2014/0324975 A1 Oct. 30, 2014

(30) Foreign Application Priority Data

Apr. 30, 2013 (JP) .................................. 2013-095721

(51) Int. Cl.
*G06F 15/173* (2006.01)
*H04L 12/18* (2006.01)
*H04N 21/65* (2011.01)
*H04N 7/15* (2006.01)
*H04N 21/258* (2011.01)

(52) U.S. Cl.
CPC ......... *H04L 12/1813* (2013.01); *H04N 7/155* (2013.01); *H04N 21/65* (2013.01); *H04N 21/258* (2013.01); *H04N 21/25858* (2013.01)

(58) Field of Classification Search
CPC ................ H04L 12/1813; H04N 7/155; H04N 21/25858

USPC .......................................................... 709/223
See application file for complete search history.

(56) References Cited

U.S. PATENT DOCUMENTS

| 6,535,917 B1 * | 3/2003 | Zamanzadeh ........... G06F 21/34 709/219 |
| 2001/0011341 A1 * | 8/2001 | Hayes, Jr. ............. G06F 9/4443 709/203 |
| 2002/0032763 A1 * | 3/2002 | Cox ...................... G06F 9/4443 709/223 |
| 2005/0060412 A1 * | 3/2005 | Chebolu ............. G06F 9/44505 709/227 |

(Continued)

FOREIGN PATENT DOCUMENTS

| EP | 2 575 032 A2 | 4/2013 |
| JP | 2008-227577 | 9/2008 |

(Continued)

OTHER PUBLICATIONS

Extended Search Report issued Sep. 22, 2014 in Patent Application No. 14166532.3.

*Primary Examiner* — Aftab N. Khan
(74) *Attorney, Agent, or Firm* — Oblon, McClelland, Maier & Neustadt, L.L.P.

(57) ABSTRACT

In response to receiving terminal identification information that identifies a request communication terminal, a communication management system obtains application information indicating one or more applications that are allowed for use by the request communication terminal, using the received terminal identification information of the request communication terminal, and transmits the application information of the request communication terminal to the request communication terminal through the communications network.

15 Claims, 16 Drawing Sheets

(56) References Cited

U.S. PATENT DOCUMENTS

| | | | |
|---|---|---|---|
| 2007/0079356 A1* | 4/2007 | Grinstein | H04L 63/08 726/2 |
| 2011/0025820 A1 | 2/2011 | Fisher et al. | |
| 2012/0019610 A1 | 1/2012 | Hornyak et al. | |
| 2012/0268784 A1 | 10/2012 | Mori | |
| 2013/0083343 A1* | 4/2013 | Ohara | G06F 3/1219 358/1.13 |
| 2014/0173694 A1* | 6/2014 | Kranz | G06F 21/606 726/4 |

FOREIGN PATENT DOCUMENTS

| | | |
|---|---|---|
| JP | 2010-157019 | 7/2010 |
| WO | WO 2012/074124 A1 | 6/2012 |

\* cited by examiner

FIG. 9

VISUAL INFORMATION MANAGEMENT TABLE

| OPERATION STATE | VISUAL INFORMATION (ICON) |
|---|---|
| ONLINE (COMMUNICATION OK) | |
| ONLINE (COMMUNICATING) | |
| ONLINE (INTERRUPTED) | |
| OFFLINE | |

FIG. 10

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 11

TERMINAL STATE MANAGEMENT TABLE

| TERMINAL ID | TERMINAL NAME | OPERATION STATE | DATE AND TIME RECEIVED | TERMINAL IP ADDRESS |
|---|---|---|---|---|
| 01aa | CHINA BEI JING OFFICE AA TERMINAL | ONLINE (COMMUNICATION OK) | 2012.11.10.13:40 | 1.2.1.3 |
| 01ab | CHINA BEI JING OFFICE AB TERMINAL | ONLINE | 2012.11.09.12:00 | 1.2.1.4 |
| ... | ... | ... | ... | ... |
| 01ba | CHINA SHANG HAI OFFICE BA TERMINAL | ONLINE (INTERRUPTED) | 2012.11.10.13:45 | 1.2.2.3 |
| 01bb | CHINA SHANG HAI OFFICE BB TERMINAL | ONLINE (COMMUNICATION OK) | 2012.11.10.13:50 | 1.2.2.4 |
| ... | ... | ... | ... | ... |
| 01ca | U.S. NY OFFICE CA TERMINAL | OFFLINE | 2012.11.10.12:45 | 1.3.1.3 |
| 01cb | U.S. NY OFFICE CB TERMINAL | ONLINE (COMMUNICATING) | 2012.11.10.13:55 | 1.3.1.4 |
| ... | ... | ... | ... | ... |
| 01da | U.S. WASH, D.C. OFFICE DA TERMINAL | ONLINE (COMMUNICATING) | 2012.11.08.12:45 | 1.3.2.3 |
| 01db | U.S. WASH, D.C. OFFICE DB TERMINAL | OFFLINE | 2012.11.10.12:45 | 1.3.2.4 |
| ... | ... | ... | ... | ... |

FIG. 12

APPLICATION USE MANAGEMENT TABLE

| TERMINAL ID \ APPLICATION ID | a001 | a002 | a003 | a004 |
|---|---|---|---|---|
| 01aa | On | On | On | On |
| 01ab | On | On | On | Off |
| 01ac | On | On | Off | On |
| ... | ... | ... | ... | ... |

FIG. 13

APPLICATION IMAGE MANAGEMENT TABLE

| APPLICATION ID / IMAGE DATA TYPE | (FIRST) VISUAL INFORMATION URL | EXECUTION IMAGE DATA URL |
|---|---|---|
| a001 | https://ucs.Ulricoh.com/aaa/aicon.jpg | https://ucs.Ulricoh.com/aaa/aaa.html |
| a002 | https://ucs.Ulricoh.com/bbb/aicon.jpg | https://ucs.Ulricoh.com/bbb/bbb.html |
| a003 | https://ucs.Ulricoh.com/ccc/aicon.jpg | https://ucs.Ulricoh.com/ccc/ccc.html |
| a004 | https://ucs.Ulricoh.com/ddd/aicon.jpg | https://ucs.Ulricoh.com/ddd/ddd.html |
| ... | ... | ... |

FIG. 14

CANDIDATE LIST MANAGEMENT TABLE

| REQUEST TERMINAL ID | COUNTERPART TERMINAL ID |
|---|---|
| 01aa | 01ab, ···, 01ba, 01bb, ···, 01ca, 01cb, 01da, 01db, ··· |
| 01ab | 01aa, 01ca, 01cb |
| 01ba | 01aa, 01ab, 01ca, 01cb, 01da, 01db |
| ... | ... |
| 01db | 01aa, 01ab, 01ba, ···, 01da, 01ca, 01cb, ···, 01da, |

APPLICATION USE MANAGEMENT TABLE

| TERMINAL ID \ APPLICATION ID | a001 | a002 | a003 | a004 |
|---|---|---|---|---|
| 01aa | On | On | If(2012/1/1-2012/9/30)On, Off | On |
| 01ab | On | On | On | Off |
| 01ac | On | On | Off | On |
| ... | ... | ... | ... | ... |

COMMUNICATION TERMINAL, COMMUNICATION MANAGEMENT SYSTEM, COMMUNICATION MANAGEMENT METHOD, RECORDING MEDIUM STORING COMMUNICATION MANAGEMENT PROGRAM

CROSS-REFERENCE TO RELATED APPLICATIONS

This patent application is based on and claims priority pursuant to 35 U.S.C. §119 to Japanese Patent Application No. 2013-095721, filed on Apr. 30, 2013, in the Japan Patent Office, the entire disclosure of which is hereby incorporated by reference herein.

BACKGROUND

Technical Field

The present invention generally relates to managing communication between or among a plurality of communication terminals.

Description of the Related Art

With the need for reducing costs or times associated with business trips, communication systems are widely used to have teleconference or videoconference among remotely located offices via a communications network such as the Internet. The communication systems allow transmission of contents data such as image data and/or sound data among a plurality of communication terminals that are remotely located from one another through the communications network.

SUMMARY

Example embodiments of the present invention include a communication management system, which includes a storage area that stores, for each one of a plurality of communication terminals managed by the communication management system, terminal identification information that identifies the communication terminal, application identification information that identifies each one of a plurality of applications that are installed or to be installed onto the communication terminal, and use permission information indicating whether each application of the plurality of applications is allowed or not allowed for use by the communication terminal, in association with each other. In response to receiving terminal identification information that identifies a request communication terminal, the communication management system obtains application information indicating one or more applications that are allowed for use by the request communication terminal, using the received terminal identification information of the request communication terminal, and transmits the application information of the request communication terminal to the request communication terminal through the communications network.

Example embodiments of the present invention include a communication terminal, which includes a storage area that stores a plurality of applications each of which is executable. The communication terminal further includes: a transmitter that transmits a request for application information indicating one or more of the plurality of applications that are allowed for use by the communication terminal, to a communication management system through the communications network, the request including terminal identification information that identifies the communication terminal; a receiver that receives the application information of the communication terminal from the communication management system, the application information being obtained by the communication management system using the terminal identification information; and a display that displays, for each one or more of the one or more of applications that are allowed for use by the communication terminal, visual information that reflects the application, based on the application information.

The other example embodiments of the present invention include a method performed by the communication management system, a method performed by the communication terminal, and a communication system including the communication management system and the communication terminal.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9 is an example data structure of a visual information management table, managed by the communication terminal of FIG. 8;

FIG. 10 is an example data structure of a terminal authentication management table, managed by the communication management system of FIG. 8;

FIG. 11 is an example data structure of a terminal state management table, managed by the communication management system of FIG. 8;

FIG. 12 is an example data structure of an application use permission management table (application use management table), managed by the communication management system of FIG. 8;

FIG. 13 is an example data structure of an application image management table, managed by the communication management system of FIG. 8;

FIG. 14 is an example data structure of a candidate list management table, managed by the communication management system of FIG. 8;

Figure 1:
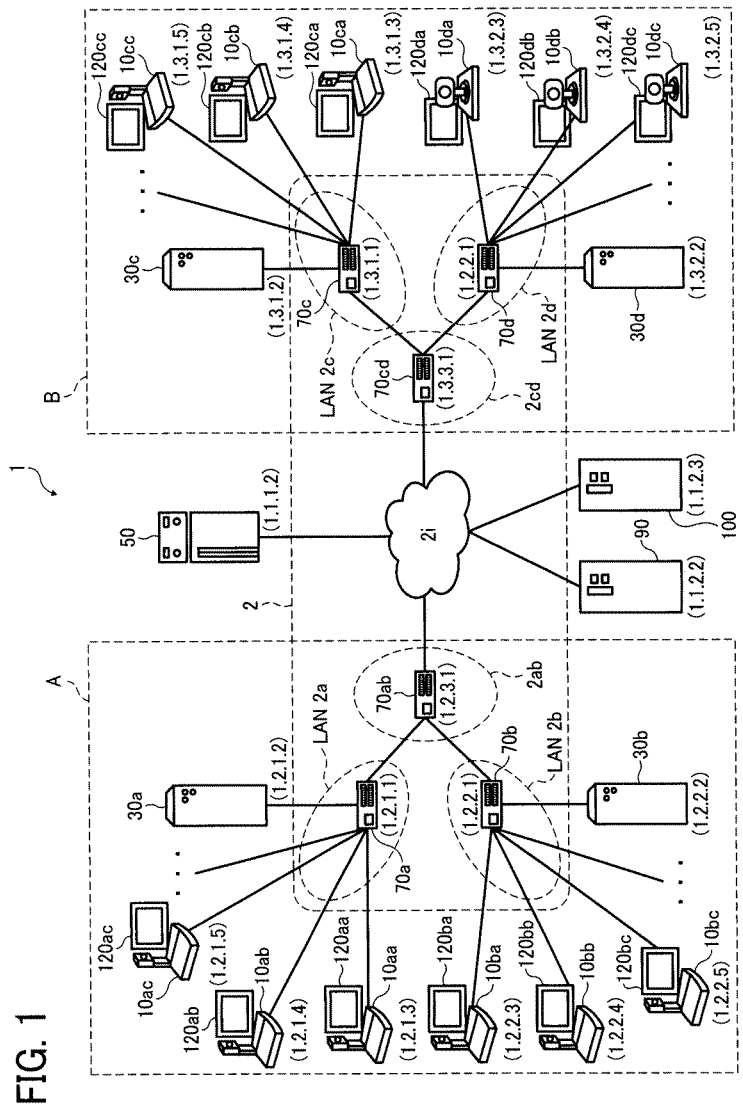
FIG. 1 is a schematic block diagram illustrating a communication system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to FIGS. 1 to 19, an example embodiment of the present invention is described.

<Configuration>

FIG. 1 illustrates a configuration of a communication system according to an example embodiment of the present invention. As illustrated in FIG. 1, the communication system 1 includes a plurality of communication terminals 10*aa*, 10*ab*, 10*ac*, 10*ba*, 10*bb*, 10*bc*, 10*ca*, 10*cb*, 10*cc*, 10*da*, 10*db*, and 10*dc*, and a plurality of displays 120*aa*, 120*ab*, 120*ac*, 120*ba*, 120*bb*, 120*bc*, 120*ca*, 120*cb*, 120*cc*, 120*da*, 120*db*, and 120*dc*, a plurality of relay devices 30*a*, 30*b*, 30*c*, and 30*d*, a communication management system 50, a program providing system 90, and a maintenance system 100. In the following examples, the communication system 1 is implemented as a videoconference system that allows at least two of the plurality of communication terminals 10 to remotely communicate with one another. More specifically, the communication system 1 allows transmission of contents data, such as image data and sound data, between or among at least two of the plurality of communication terminals 10. The communication system 1 further includes a plurality of routers 70*a*, 70*b*, 70*c*, 70*d*, 70*ab*, and 70*cd*, which may be collectively or each referred to as the router 70. The router 70 selects a route that is most suitable for transmitting contents data such as image data and sound data. In this example, a moving image, a still image, or both of the still image and the moving image, may be transmitted as the image data.

Still referring to FIG. 1, the terminals 10*aa*, 10*ab*, and 10*ac*, the relay device 30*a*, and the router 70*a* are connected to a local area network (LAN) 2*a*. The terminals 10*ba*, 10*bb*, and 10*bc*, the relay device 30*b*, and the router 70*b* are connected to a LAN 2*b*. The LAN 2*a* and the LAN 2*b* are connected to a leased line 2*ab* in which the router 70*ab* is provided. It is assumed that the LAN 2*a*, LAN 2*b*, and the leased line 2*ab*, are located in an area X. For example, assuming that the area X is any area in China, the LAN 2*a* could be located within an office in a city such as Beijng, and the LAN 2*b* could be located within an office in another city such as Shanghai.

The terminals 10*ca*, 10*cb*, and 10*cc*, the relay device 30*c*, and the router 70*c* are connected to a LAN 2*c*. The terminals 10*da*, 10*db*, and 10*dc*, the relay device 30*d*, and the router 70*d* are connected to a LAN 2*d*. The LAN 2*c* and the LAN 2*d* are connected to a leased line 2*cd* in which the router 70*cd* is provided. It is assumed that the LAN 2*c*, LAN2*d*, and leased line 2*cd* are located in an area Y apart from the area X. For example, assuming that the area is any area in the United States, the LAN 2*c* could be located within an office in a city such as New York, and the LAN 2*d* could be located within an office in another city such as Washington, D.C. The area X and the area Y are connected through the Internet 2*i*, via the routers 70*ab* and 70*cd*.

For the descriptive purposes, in this example, any number of the plurality of communication terminals 10aa to 10dc may be collectively or each referred to as the terminal 10. Any number of the plurality of displays 120aa to 120dc may be collectively or each referred to as the display 120. Any number of the plurality of relay devices 30a, 30b, 30c, and 30d may be collectively or each referred to as the relay device 30. The communication management system 50 may be referred to as the "management system" 50.

The terminal 10 that transmits data to another terminal 10 to carry out videoconference is referred to as the request terminal 10. The terminal 10 that receives data from another terminal 10 to carry out videoconference is referred to as the counterpart terminal 10. For example, the request terminal 10 includes any terminal 10 that requests another terminal 10 to start videoconference, and the counterpart terminal 10 includes any terminal 10 that is requested by the request terminal 10 to start videoconference.

The management system 50, the program providing system 90, and the maintenance system 100 are connected through the Internet 2i to the terminal 10 and the relay device 30. Any one of the management system 50, the program providing system 90, and the maintenance system 100 may be located at any location within or outside any one of the area X and the area Y.

In this example, the communications network 2 includes the LAN 2a, LAN 2b, leased line tab, Internet 2i, leased line 2cd, LAN 2c, and LAN 2d. Any one or any portion of these lines or any other lines that may be included in the communications network 2 may be implemented as wired network or wireless network such as Wireless Fidelity (WiFi) network or Bluetooth network.

As shown in FIG. 1, the terminal 10, the relay device 30, the management system 50, the router 70, the program providing system 90, and the maintenance system 100 are each provided with four digit numbers. These four digit numbers separated by dots are the simple expressions of IP addresses respectively assigned to any one of the devices shown in FIG. 1, each of which has a function of communication device. For example, the IP address of the terminal 10aa is "1.2.1.3". For simplicity, it is assumed that the IP address is expressed in IPv4. Alternatively, the IP address may be expressed in IPv6.

Further, in this example, the terminal 10 may be communicated in various ways. For example, at least two different terminals 10 that are located at different rooms in the same office, or at least two different terminals 10 that are located at different offices that are remotely located from one another, may communicate with one another. In another example, at least two different terminals 10 that are located in the same room may communicate with one another. In another example, one terminal 10 that is located indoor and another terminal 10 that is located outdoor, or at least two different terminals 10 that are both located outdoor, may communicate with one another. When the terminal 10 is located outdoor, the terminal 10 communicates with the other terminal 10 through a wireless network such as a wireless network designed for a mobile phone.

The communication terminal 10 of FIG. 1 allows a user to communicate with another user at the counterpart communication terminal 10, by transmitting or receiving contents data such as image data and sound data. For example, any terminal that may be used for video communication such as videoconference may be used. Further, the terminal 10 transmits or receives contents data to or from the counterpart terminal 10 using a predetermined communications protocol. The communications protocol used by the terminal 10 is mainly defined by a call control protocol used for connecting or disconnecting connections with the counterpart terminal, and an encoding format used for encoding the contents data to an IP packet.

Examples of the call control protocol being used by the terminal 10 include, but not limited to, (1) session initial protocol (SIP), (2) H.323, (3) the extended SIP, (4) Instant Messenger (IM) Protocol such as extensible messaging and presence protocol (XMPP), ICQ (Registered Trademark), AIM (Registered Trademark), or Skype (Registered Trademark), (5) protocol using the SIP message method, (6) Internet relay chat (IRC) protocol, and (7) extended IM based protocol such as Jingle.

The relay device 30 is a computer system, which may be implemented by one or more computers, to relay contents data between or among the terminals 10. The management system 50 is a computer system, which may be implemented by one or more computers, to centrally manage various information such as login information of the terminal 10, the communication state of the terminal 10, candidate (contact) list information, and the communication state of the relay device 30.

The program providing system 90 is a computer system, which may be implemented by one or more computers, to provide programs to the terminal 10, the relay device 30, the management system 50, and the maintenance system 100, respectively, through the communications network 2.

The maintenance system 100 is a computer system, which may be implemented by one or more computers, to maintain, manage, fix, or upgrade at least one of the terminal 10, relay device 30, management system 50, and program providing system 90. Assuming that the maintenance system 100 is provided within a country, and the terminal 10, relay device 30, management system 50, and program providing system 90 are each installed outside the country, the maintenance system 100 maintains, manages, fixes, or upgrades at least one of the terminal 10, relay device 30, management system 50, and program providing system 90, remotely through the communications network 2. The maintenance system 100 may manage maintenance of at least one of the terminal 10, relay device 30, management system 50, and program providing system 90 without using the communications network 2. For example, a machine type number, a manufacturing number, customer information, maintenance and repair information, and failure log information may be maintained at the maintenance system 100 without using the communications network 2.

The terminal 10 is previously installed with a plurality of communication applications, each of which allows the terminal 10 to communicate with one or more counterpart terminals 10, before the terminal 10 is shipped to the user.

The plurality of communication terminals 10 are capable of communicating with one another via the communications network 2, using the same communication applications or the communication applications that are compatible. In this example, the communication application includes any desired communication or message application that allows communication between or among the plurality of communication terminals 10. Examples of communication application include, but not limited to, videoconference application, Skype, Google Talk, LINE, FaceTime, Kakao Talk, and Tango.

Figure 2:
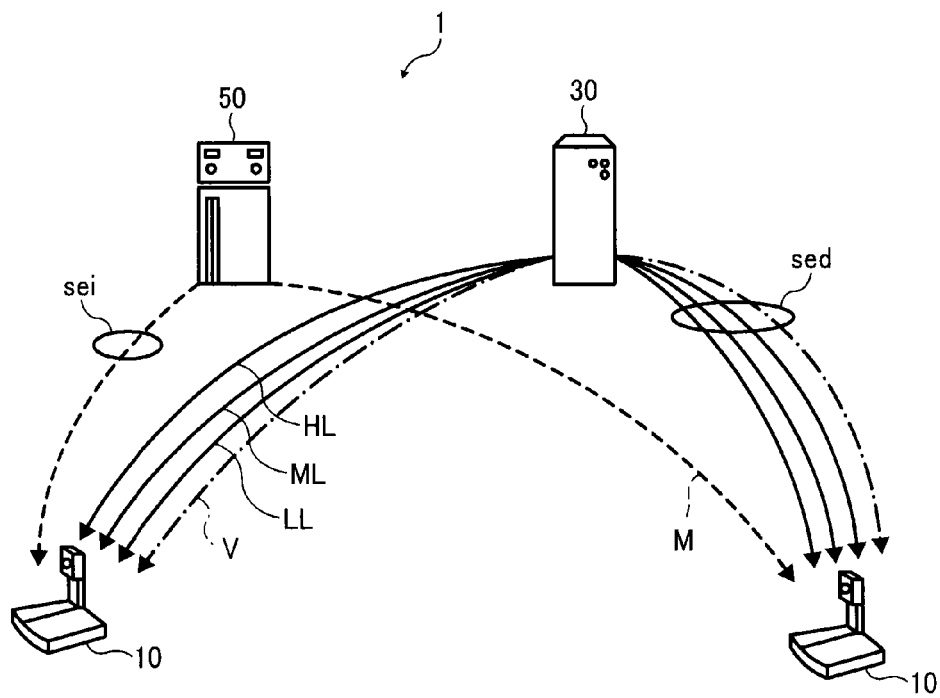
FIG. 2 is an illustration for explaining communication between or among a plurality of communication terminals of the communication system of FIG. 1.

As illustrated in FIG. 2, in the communication system 1, the request terminal 10 and the counterpart terminal 10 first establish a management data session sei to start transmission and reception of various types of management data "sei" through the management system 50. Further, in this example, the request terminal 10 and the counterpart terminal 10 establish four contents data sessions "sed" to transmit or receive contents data through the relay device 30. The four contents data sessions, which may be referred to as image and/or sound data sessions, include a session "HL" to transmit high-level resolution image data HL, a session "ML" to transmit medium-level resolution image data ML, a session "LL" to transmit low-level resolution image data LL, and a session "V" to transmit sound data V. In alternative to sending image data in more than one session based on resolution, the image data may be sent through one session.

Figure 3A:
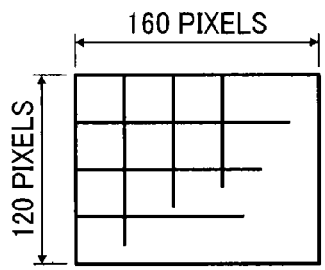
FIGS. 3A to 3C are illustrations for explaining image quality of image data transmitted or received by the communication system of FIG. 1, according to an example embodiment of the present invention.
Figure 3B:
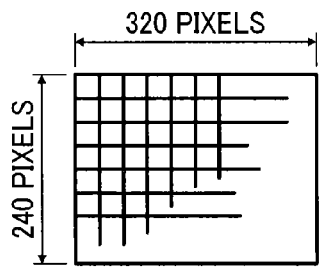
Figure 3C:
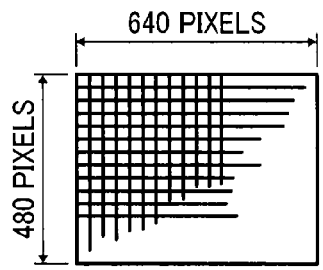

Referring now to FIGS. 3A to 3C, various image data having different resolution levels, which are respectively transmitted by the terminal 10 of the communication system 1, are explained. Referring to FIG. 3A, the low-level resolution image data, which functions as a base image, has 160 pixels in the horizontal direction and 120 pixels in the vertical direction. Referring to FIG. 3B, the medium-level resolution image data has 320 pixels in the horizontal direction and 240 pixels in the vertical direction. Referring to FIG. 3C, the high-level resolution image data has 640 pixels in the horizontal direction and 480 pixels in the vertical direction. In case of communicating with a narrowband signal line, low-quality image data that is generated based on the low-level resolution image data, which is the base image, is transmitted. In case of communicating with a wideband signal line, medium-quality image data that is generated based on the low-level resolution image data and the medium-level resolution image data is transmitted. In case of communicating with a broadband signal line, high-quality image data that is generated based on the low-level resolution image data, the medium-level resolution image data, and the high-level resolution image data is transmitted. Any one of the above-described types of image data may be transmitted together with sound data, which has relatively a data size smaller than that of the image data.

<Hardware Structure of Communication System>

Figure 4:
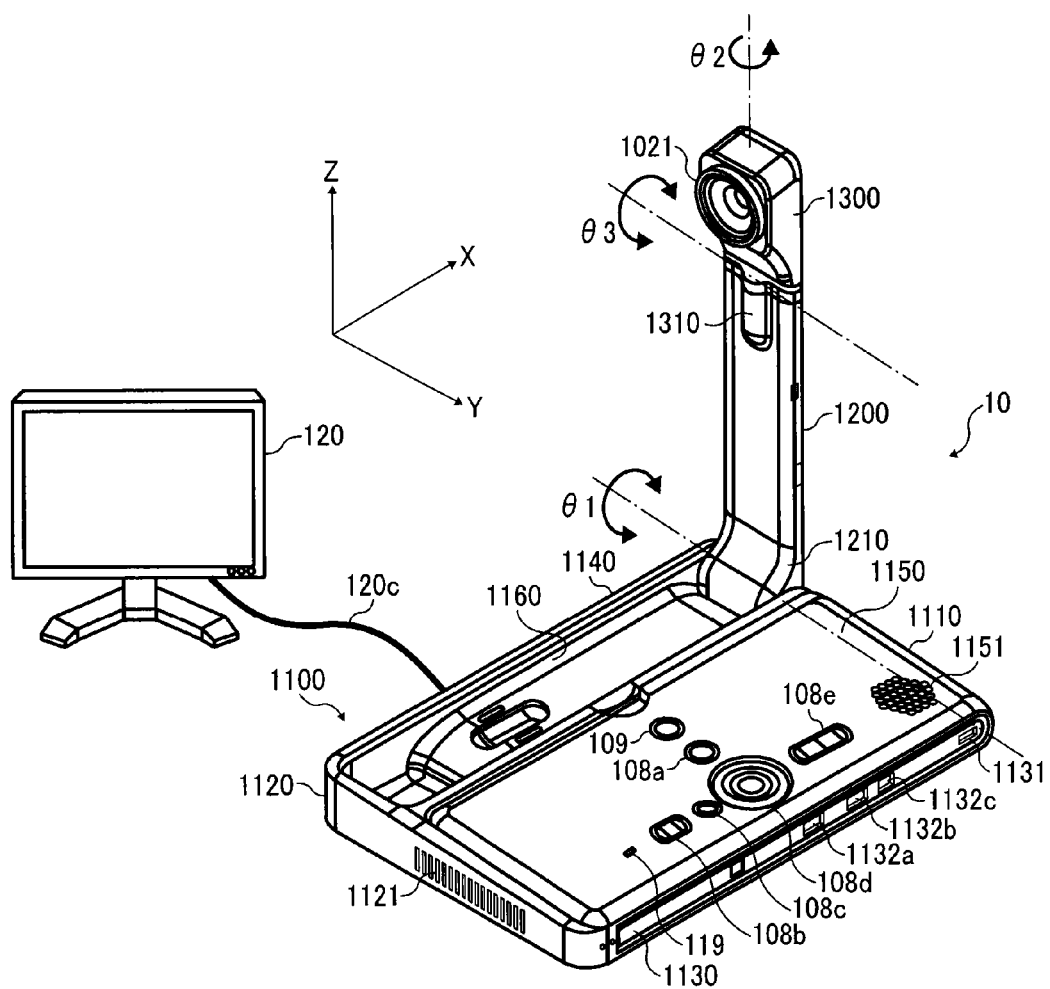
FIG. 4 is a perspective view illustrating the outer appearance of a communication terminal of the communication system of FIG. 1.

FIG. 4 is a perspective view illustrating the outer appearance of the communication terminal 10 of the communication system 1 of FIG. 1. As illustrated in FIG. 4, the terminal 10 includes a body 1100, an arm 1200, and a camera housing 1300. The body 1100 includes a front side wall 1110 having a plurality of air intake holes that are formed over the nearly entire surface of the intake surface of the front side wall 1110. The body 1100 further includes a back side wall 1120 provided with an exhaust surface 1121 having a plurality of exhaust holes over the nearly entire surface of the exhaust surface 1121. When a cooling fan that is provided within the body 1100 is driven, air flows in through the intake holes of the intake surface and out through the exhaust holes of the exhaust surface 1121. The body 1100 further includes a right side wall 1130 formed with a sound pickup hole 1131. Through the sound pickup hole 1131, a microphone 114 (FIG. 5) of the terminal 10 is able to catch sounds such as human voice or any sound including noise.

Figure 5:
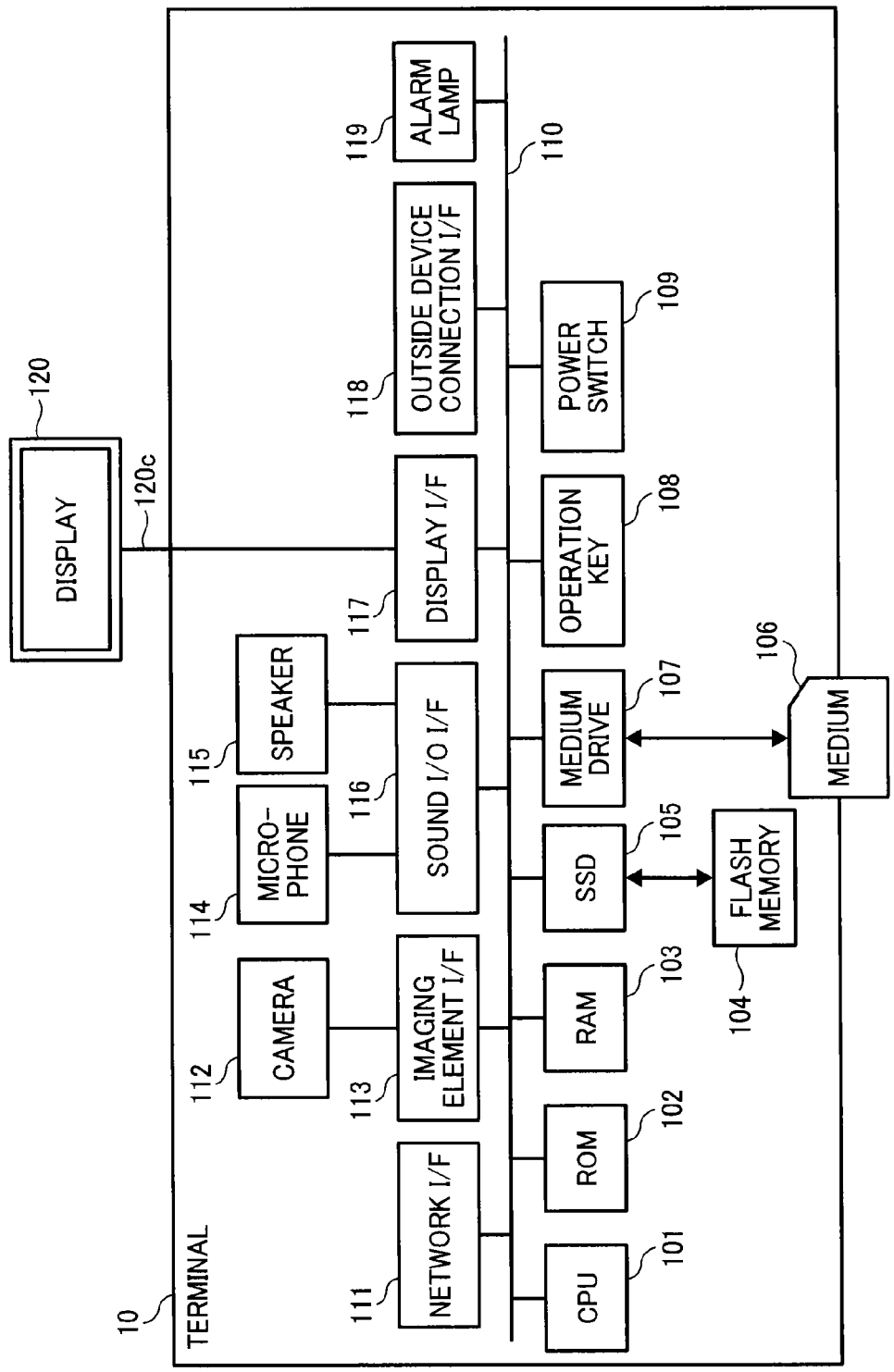
FIG. 5 is a schematic block diagram illustrating a hardware structure of the communication terminal of FIG. 4.

The body 1100 has an operation panel 1150, which is provided at a front surface toward the right side wall 1130. The operation panel 1150 includes a plurality of operation keys 108a to 108e ("the operation key 108"), a power switch 109, an alarm lamp 119, and a plurality of sound output holes 1151. Through the sound output holes 1151, a speaker 115 (FIG. 5) of the terminal 10 is able to output sounds such as sounds generated based on human voice. The body 1100 further includes a holder 1160, which is provided at the front surface toward the left side wall 1140. The holder 1160, which has a concave shape, accommodates therein the arm 1200 and the camera housing 1300. The right side wall 1130 is further provided with a plurality of connection ports 1132a to 1132c ("connection ports 1132"). The connection ports 1132 allow electrical connection to an external device through an outside device connection I/F 118 (FIG. 5). The body 1100 further includes a left side wall 1140, which is provided with a connection port to connect the external display 120 to the display I/F 117 through a cable 120c.

The arm 1200 is fixed to the body 1100 via a torque hinge 1210. With the torque hinge 1210, the arm 1200 can be rotated in directions of up and down with respect to the body, while making a tilt angle θ1 of up to 135 degrees. FIG. 4 illustrates the case where the tilt angle θ1 is 90 degrees.

The camera housing 1300 incorporates therein the camera 112 (FIG. 5) that takes an image of an object. The object may be a part of a user, document, or a room where the terminal 10 is located. The camera housing 1300 is provided with a torque hinge 1310. The camera housing 1300 is fixed to the arm 1200 through the torque hinge 1310. With the torque hinge 1310, the camera housing 1300 can be rotated with respect to the arm 1200, in the direction of up, down, right, and left, such that the camera housing 1300 is kept at a desired position. More specifically, the camera housing 1300 can be rotated, while making a pan angle θ2 from about −180 degrees to 180 degrees in the direction right and left, and a tilt angle θ3 that ranges from about −45 degrees to +45 degrees in the direction of up and down. In FIG. 4, the pan angle θ2 and the tilt angle θ3 are each 0 degree.

In alternative to the outer appearance of FIG. 4, the communication terminal 10 may be implemented to have any other outer appearance. For example, the communication terminal 10 may look like the general-purpose PC, smart phone, or tablet. Further, the camera or the microphone does not have to be incorporated into the terminal 10, such that the camera or the microphone that is independent of the terminal 10 may be connected to the terminal 10.

The relay device 30, the management system 50, the program providing system 90, and the maintenance system 100 are each implemented by any desired number of general-purpose computers such as a personal computer or a server computer. For simplicity, explanation of the outer appearance of the computer is omitted.

FIG. 5 is a schematic block diagram illustrating a hardware structure of the communication terminal 10. As illustrated in FIG. 5, the terminal 10 includes a central processing unit (CPU) 101, a read only memory (ROM) 102, a random access memory (RAM) 103, a flash memory 104, a solid state drive (SSD) 105, a medium drive 107, the operation key 108, the power switch 109, a network interface (I/F) 111, the camera 112, an imaging element interface (I/F) 113, the microphone 114, the speaker 115, a sound input/output interface (I/O I/F) 116, the display interface (I/F) 117, the outside device connection interface (I/F) 118, and an alarm lamp 119, which are electrically connected through a bus 110 such as an address bus or data bus. The CPU 101 controls entire operation of the terminal 10. The ROM 102 stores therein a control program for execution by the CPU 101, such as an initial program loader (IPL). The RAM 103 functions as a work area of the CPU 101. The flash memory 104 stores therein various data such as the terminal control program, image data, or sound data such as voice data. The SSD 105 controls reading or writing of various data with respect to the flash memory 104 under control of the CPU 101. The medium drive 107 controls reading or writing of various data with respect to a removable recording medium 106 such as a flash memory. The operation key 108 allows the user to input a user instruction, for example, by allowing the user to select a communication destination such as the counterpart terminal 10. The power switch 109 allows the user to switch on or off the power of the terminal 10. The network I/F 111 allows the terminal 10 to transmit data through the communications network 2.

The camera 112 takes an image of an object to obtain image data under control of the CPU 101. The imaging element I/F 113 controls operation of the camera 112. The microphone 114 catches sounds such as voice of the user at the terminal 10. The speaker 115 outputs sounds such as sounds generated based on voice of the user at the counterpart terminal 10. The sound I/O I/F 116 controls input or output of sound signals such as voice signals with respect to the microphone 114 and the speaker 115 under control of the CPU 101. The display I/F 117 transmits image data to the display 120 under control of the CPU 101. The outside device connection I/F 118 controls connection of the terminal 10 to various types of outside device. The alarm lamp 119 generates notification when an error is detected in the terminal 10.

The display 120 may be implemented by a liquid crystal display (LCD) or an organic light emitting display, which displays various data such as an image of an object or an operation icon. As illustrated in FIGS. 4 and 5, the display 120 is connected to the display I/F 117 through the cable 120c. The cable 120c may be implemented by an analog RCB (VGA) signal cable, a component video cable, a high-definition multimedia interface (HDMI) signal cable, or a digital video interactive (DVI) signal cable.

The camera 112 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD).

The outside device connection I/F 118 may be connected to an outside device such as an external camera, external microphone, or external speaker through a universal serial bus (USB) cable that is connected through the port 1132 of the body 1100 (FIG. 4). When the external camera is connected to the terminal 10, the CPU 101 causes the terminal 10 to capture an image using the external camera, rather than the camera 112 that is incorporated in the terminal 10. When the external microphone or the external speaker is connected to the terminal 10, the CPU 101 causes the terminal 10 to use the external microphone or the external speaker in replace of the incorporated microphone 114 or the incorporated speaker 115.

The recording medium 106, which can be freely attached to or detached from the terminal 10, includes any desired type of recording medium. In alternative to the flash memory 104, any nonvolatile memory that is readable and writable under control of the CPU 101 may be used such as Electrically Erasable and Programmable ROM (EEPROM).

The terminal control program may be written onto a recording medium that is readable by a general-purpose computer such as the recording medium 106 in any format that is installable or executable by a general-purpose computer. Once the terminal control program is written onto the recording medium, the recording medium may be distributed. Further, the terminal control program may be stored in any desired memory other than the flash memory 104, such as the ROM 102.

Figure 6:
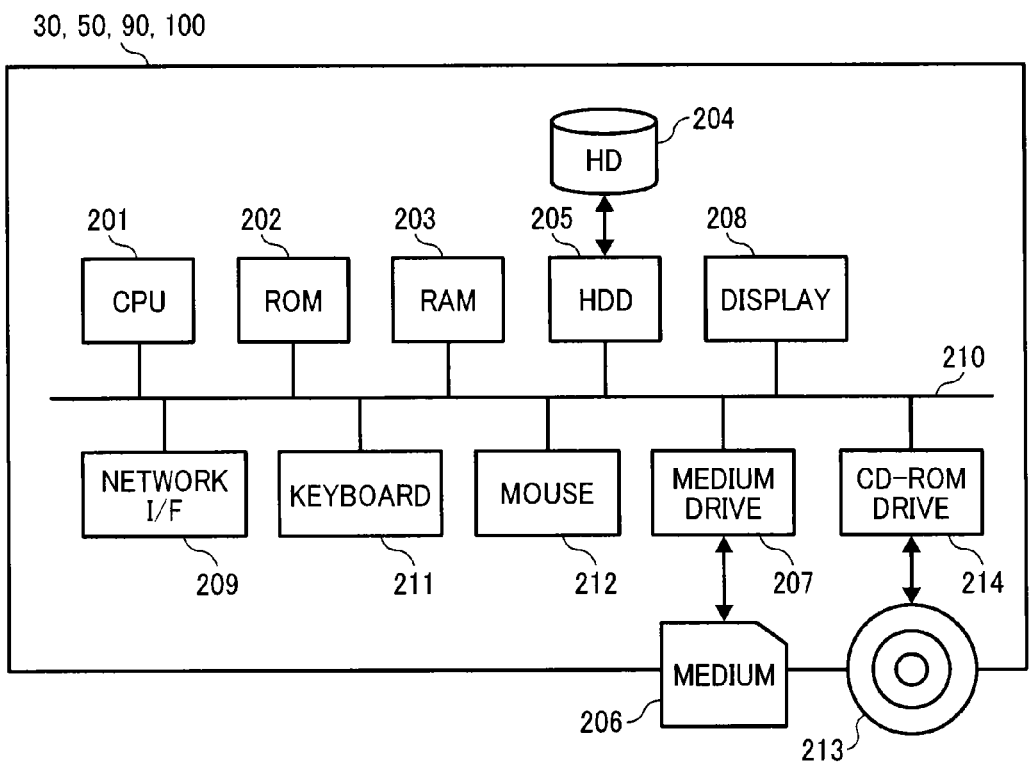
FIG. 6 is a schematic block diagram illustrating a hardware structure of any one of the communication management system, relay device, program providing system, and maintenance system of the communication system of FIG. 1.

FIG. 6 illustrates a hardware structure of the management system 50 of FIG. 1. The management system 50 includes a CPU 201, a ROM 202, a RAM 203, the HD 204, a hard disk drive (HDD) 205, a medium drive 207, a display 208, a network interface (I/F) 209, a keyboard 211, a mouse 212, and a CD-ROM drive 214, which are electrically connected through a bus 210 such as an address bus or a data bus.

The CPU 201 controls entire operation of the management system 50. The ROM 202 stores a control program for execution by the CPU 201, such as an IPL. The RAM 203 functions as a work area of the CPU 201. The HD 204 stores therein various data such as the communication management program. The HDD 205 controls reading or writing of various data with respect to the HD 204 under control of the CPU 201. The medium drive 207 controls reading or writing of various data with respect to a removable recording medium 206 such as a flash memory. The display 208 displays various data such as a cursor, menu, window, character, or image. The network I/F 209 allows the management system 50 to transmit data through the communications network 2. The keyboard 211 includes a plurality of keys, each of which is used for inputting a user instruction through a character, a numeral, or a symbol. The mouse 212 allows the user to input a user instruction including, for example, selection or execution of a specific instruction, selection of an area to be processed, and instruction of cursor movement. The CD-ROM drive 214 controls reading or writing of various data with respect to a CD-ROM 213. In alternative to the CD-ROM 213, any removable recording medium may be used.

The communication management program may be written onto a recording medium that is readable by a general-purpose computer such as the recording medium 206 or the CD-ROM 213 in any format that is installable or executable by a general-purpose computer. Once the communication management program is written onto the recording medium, the recording medium may be distributed. Further, the communication management program may be stored in any desired memory other than the HD 204, such as the ROM 202.

The relay device 30 is substantially similar in hardware structure to the management system 50 of FIG. 6, except for replacement of the management program with a relay device control program that is used for controlling the relay device 30. The relay device control program may be written onto a recording medium that is readable by a general-purpose computer such as the recording medium 206 or the CD-ROM 213 in any format that is installable or executable by the general-purpose computer. Once the relay device control program is written onto the recording medium, the recording medium may be distributed. Further, the relay device control program may be stored in any desired memory other than the HD 204, such as the ROM 202.

The program providing system 90 is substantially similar in hardware structure to the management system 50 of FIG. 6, except for replacement of the management program with a program providing program that is used for controlling the program providing system 90. The program providing program may be written onto a recording medium that is readable by a general-purpose computer such as the recording medium 206 or the CD-ROM 213 in any format that is installable or executable by the general-purpose computer. Once the program providing program is written onto the recording medium, the recording medium may be distributed. Further, the program providing program may be stored in any desired memory other than the HD 204, such as the ROM 202.

The maintenance system 100 is substantially similar in hardware structure to the management system 50 of FIG. 6, except for replacement of the management program with a maintenance program that is used for controlling the maintenance system 100. The maintenance program may be written onto a recording medium that is readable by a general-purpose computer such as the recording medium 206 or the CD-ROM 213 in any format that is installable or executable by the general-purpose computer. Once the maintenance program is written onto the recording medium, the recording medium may be distributed. Further, the maintenance program may be stored in any desired memory other than the HD 204, such as the ROM 202.

Other examples of removable recording medium, which may be used in replace of the CD-ROM 213, include, but not limited to, compact disc recordable (CD-R), digital versatile disk (DVD), and blue ray disc.

Figure 7:
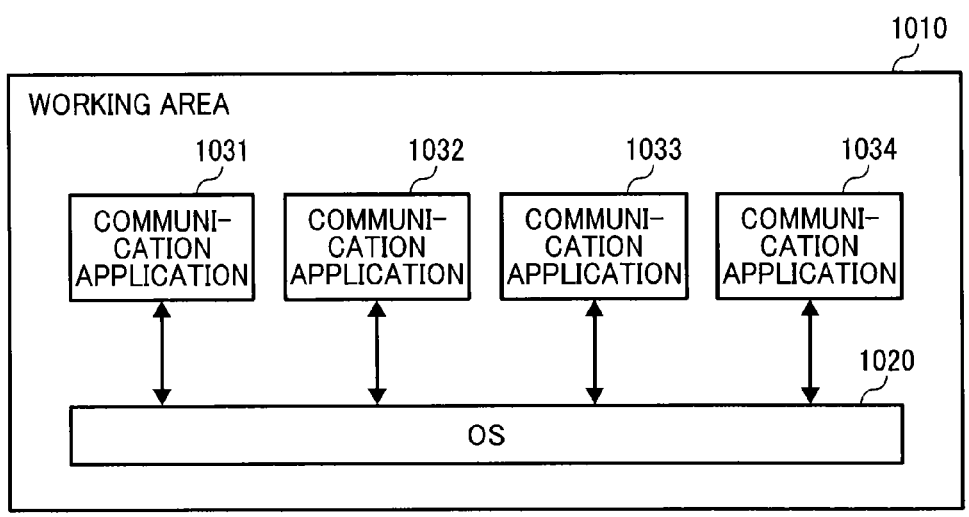
FIG. 7 is a schematic block diagram illustrating a software configuration of the communication terminal of FIG. 5, according to an example embodiment of the present invention.

FIG. 7 illustrates a software configuration of the communication terminal 10. As illustrated in FIG. 7, the CPU 101 loads an operation system (OS) 1020, and at least one of communication applications 1031, 1032, 1033, and 1034, onto a work area 1010 of the RAM 103. The OS 1020 is basic software that manages entire operation of the communication terminal 10, through providing basic functions. The communication applications 1031, 1032, 1033, and 1034 each allow the terminal 10 to communicate with the other communication terminal. In this example, the communication applications 1031, 1032, 1033, and 1034 use different communication protocols. Further, in this example, these applications including the OS 1020 and the communication applications 1031 to 1034 are previously installed onto a memory area of the terminal 10, before the terminal 10 is shipped. Since these communication applications are previously installed, the user does not have to download a communication application or install a communication application, which could be cumbersome.

In alternative to using any one of the pre-installed communication applications, the user may download any other communication application for use. After the terminal 10 is shipped, for example, to the user site, any other application may be additionally stored onto the work area 1010 or any one of the pre-installed applications may be deleted from the work area 1010, for example, when software such as the OS 1020 of the terminal 10 is updated. For example, the terminal 10 may access the program providing system 90 of FIG. 1 to download software from the program providing system 90 through the communications network 2, to newly install such software. In another example, the terminal 10 may access the program providing system 90 to download software from the program providing system 90 through the communications network 2, to update the pre-installed software or the previously installed software with the downloaded software to upgrade the software version. With the addition or upgrading of the software installed onto the terminal 10, any one of the applications being installed on the terminal 10 may be added, deleted, or modified.

Further, the communication applications, which are previously installed onto the terminal 10, are not limited to the communication applications 1031 to 1034 illustrated in FIG. 7, such that any number or any type of communication applications may be installed onto the terminal 10. It is, however, desirable to install the plurality of different communication applications onto the terminal 10, such as the plurality of communication applications capable of communicating using different communication protocols. The communication protocols may be any one of the above-described communication protocols.

Further, in addition to at least one communication application, the terminal 10 may be previously installed with any number or any type of applications, or may download any number or any type of applications for use. The other examples of application for use by the terminal 10 include, but not limited to, image capturing application that captures an image, utility application that manages various data related to the terminal 10 such as checking or re-setting configuration data of the terminal 10, editing an address book, checking a charge fee, etc., participation control application that manages communication (videoconference) while restricting some participants, chat application that manages text-based chat communication such as by Instant Messaging, update control application that updates software on the terminal 10, and maintenance application that maintains environments of the terminal 10 such as software of the terminal 10.

<Functional Structure of Communication System>

Figure 8:
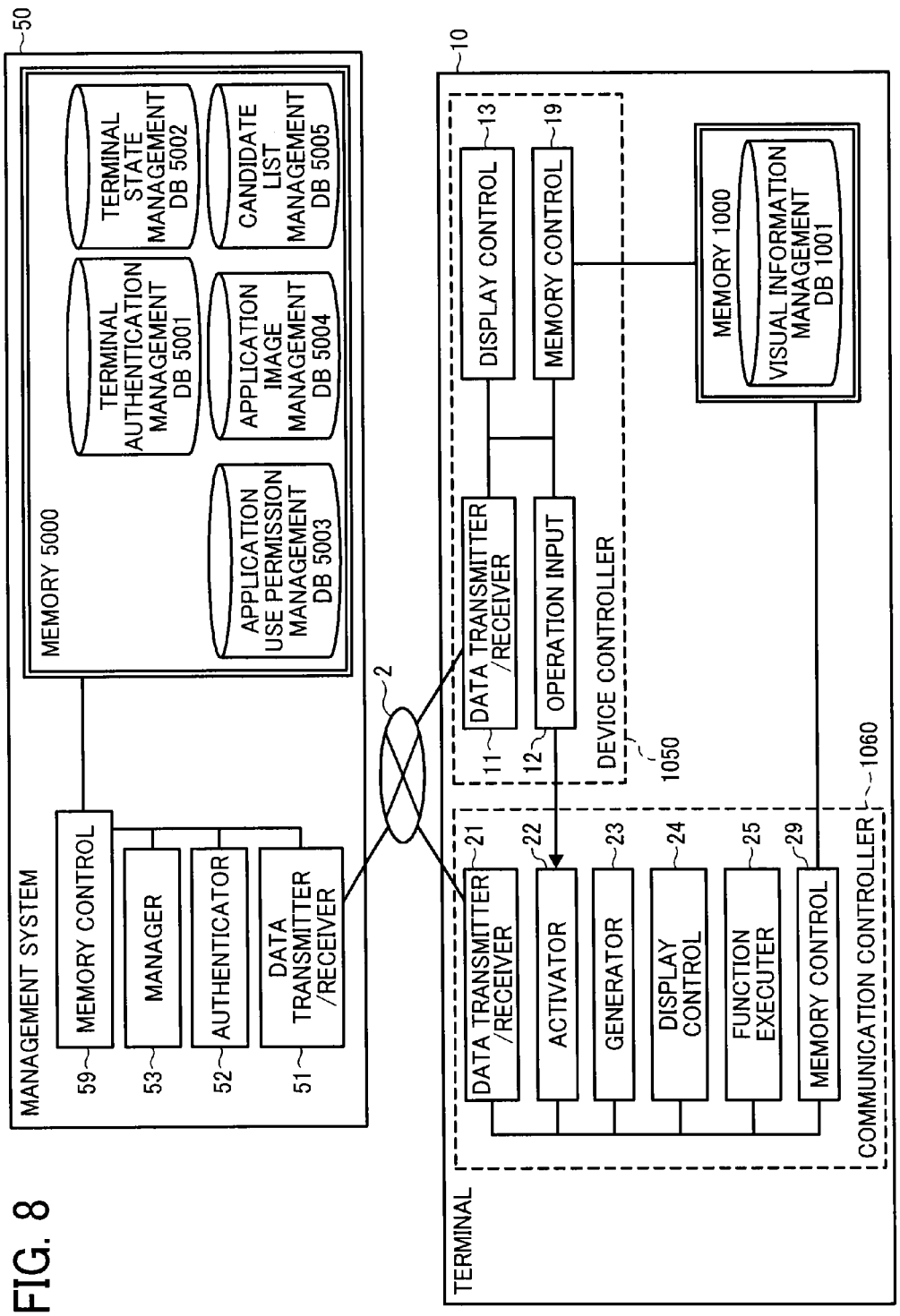
FIG. 8 is a schematic block diagram illustrating a functional structure of the communication terminal, and communication management system of the communication system of FIG. 1, according to an example embodiment of the present invention.

Next, a functional structure of the communication system of FIG. 1 is explained according to an example embodiment of the present invention. FIG. 8 is a schematic block diagram illustrating a functional structure of the communication system 1. As illustrated in FIG. 8, the terminal 10 and the management system 50 exchange data with one another through the communications network 2. In FIG. 8, the relay device 30, the program providing system 90 and the maintenance system 100 of FIG. 1 are omitted.

<Functional Structure of Terminal>

The communication terminal 10 includes a device controller 1050 and a communication controller 1060. The OS 1020 of FIG. 7 operates as the device controller 1050, when executed. Any one of the communication applications 1031, 1032, 1033, and 1034 of FIG. 7 may function as the communication controller 1060, when executed.

The device controller 1050 includes a data transmitter/receiver 11, an operation input 12, a display control 13, and a memory control 19. These elements shown in FIG. 8 correspond to functions, which are performed by any one of the hardware elements of FIG. 5 in response to the instructions that are generated by the CPU 101 according to the OS 1020 operating as the device controller 1050 that is deployed on the RAM 103 from the flash memory 104. In this example, the OS 1020 is specific to the communication terminal 10, which performs communication with the counterpart terminal 10.

The communication controller 1060 includes a data transmitter/receiver 21, an activator 22, a generator 23, a display control 24, a function executer 25, and a memory control 29.

These elements shown in FIG. 8 correspond to functions, which are performed by any one of the hardware elements of FIG. 5 in response to the instructions that are generated by the CPU 101 according to the communication application 1031, 1032, 1033, or 1034 that is deployed on the RAM 103 from the flash memory 104.

The communication terminal 10 further includes a memory 1000, which may be any one of the ROM 102, RAM 103, and flash memory 104 of FIG. 5. The memory 1000 stores therein a visual information management database (DB) 1001.

FIG. 9 illustrates an example data structure of a visual information management table, which is one example of the visual information management DB 1001. The visual information management table stores, for each one of operation state information indicating an operation state of the counterpart terminal, visual information to be displayed on the display 120 in the form of candidate (contact) list. In this example, the visual information is expressed as an icon representing a specific operation state of the terminal as illustrated in FIG. 9. The terminal 10 may obtain visual information to be stored in the visual information management table of FIG. 9 from the management system 50, for example, as a response in response to the login request information transmitted from the terminal 10 (S2 of FIG. 15). Alternatively, the visual information may be previously stored in the memory 1000, before the terminal 10 is shipped to the user's site. In this example, the visual information mainly includes visual information indicating that the operation state of the counterpart terminal is online and available for communication ("online, communication OK"), visual information indicating that the operation state of the counterpart terminal is online and communicating "online, communicating"), information indicating that the operation state of the counterpart terminal is online but interrupted ("online, interrupted"), and visual information indicating that the operation state of the counterpart terminal is offline ("offline").

Referring now to FIGS. 5 and 8, a functional structure of the device controller 1050 of the communication terminal 10 is explained according to an example embodiment of the present invention. In this example, the operations or functions that are performed by the terminal 10, which include the operations or functions performed by the functional elements shown in FIG. 8, are performed in cooperation with one or more hardware devices of the terminal 10 that are shown in FIG. 5. More specifically, these elements shown in FIG. 8 correspond to a plurality of functions or functional modules, which are executed according to an instruction of the CPU 101 (FIG. 5) that is generated according to the program being loaded from the flash memory 104 onto the RAM 103. The program may be the OS 1020, or any one of the communication applications 1032 to 1034 operating under control of the OS 1020.

The data transmitter/receiver 11 of the communication terminal 10, which may be implemented by the network I/F 111 under control of the CPU 101 (FIG. 5), transmits or receives various data or information to or from another communication terminal, device, or system, through the communications network 2.

The operation input 12 may be implemented by such as the operation key 108 or the power switch 109 (FIG. 4) under control of the instructions received from the CPU 101. The operation input 12 receives a user instruction input by the user, through the operation key 108 or the power switch 109, such as a user selection. For example, when the user selects "ON" using the power switch 109, the operation input 12 (FIG. 8) receives a user instruction for turning the power on, and causes the terminal 10 to turn on the power.

In another example, the operation input 12 receives a user instruction for selecting one of the plurality of applications being displayed on the display. In response to the user instruction, the operation input 12 generates an activation request to the selected application.

Figure 17:
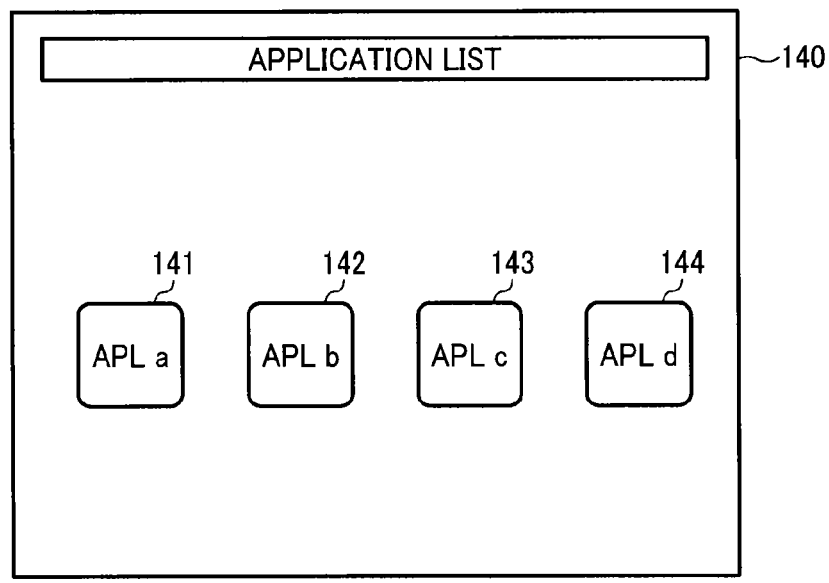
FIG. 17 is an illustration of an example communication application list screen, displayed at the communication terminal.
Figures 19, 20:
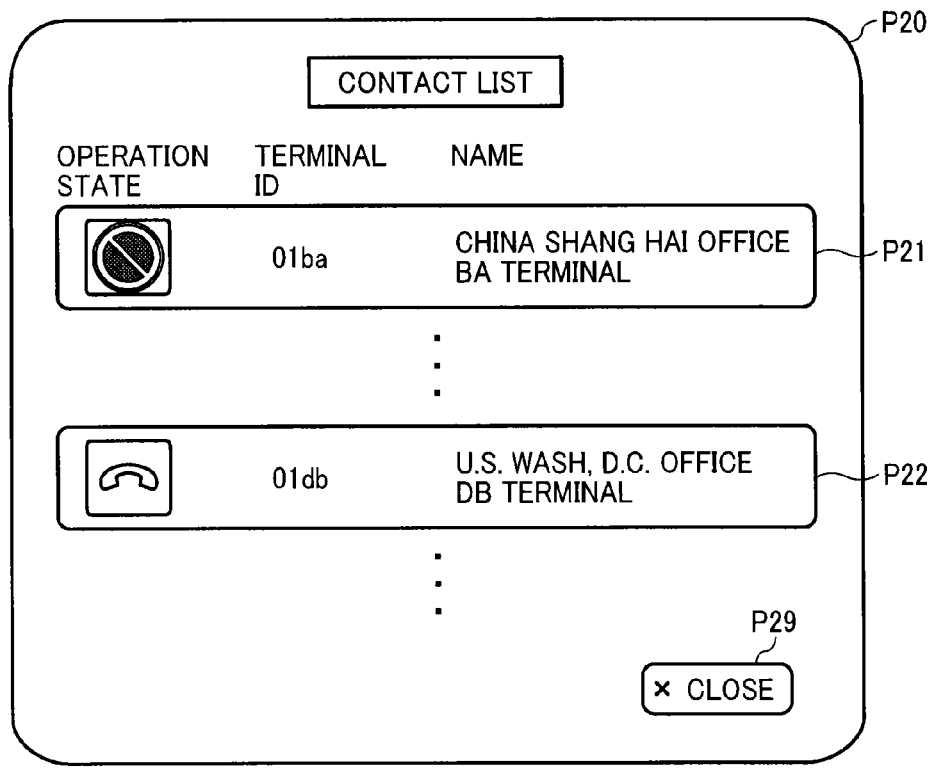
FIG. 19 is an illustration of an example contact list screen, displayed at the communication terminal.
FIG. 20 is an example data structure of an application use permission management table (application use management table), managed by the communication management system of FIG. 8.

The display control 13, which may be implemented by the display I/F 117 under control of the instructions received from the CPU 101, controls transmission of image data to the display 120, based on data received from the counterpart communication terminal. The display control 13 further causes the display 120 to display a contact list screen as illustrated in FIG. 19, or a communication application list screen as illustrated in FIG. 17.

The memory control 19, which may be implemented by the instructions received from the CPU 101 that may operate in cooperation with the SSD 105, stores or reads various data with respect to the memory 1000.

Still referring to FIGS. 5 and 8, a functional structure of the communication controller 1060 of the communication terminal 10 is explained according to an example embodiment of the present invention. More specifically, in this example, the operations or functions performed by the terminal 10, which include the operations or functions performed by the elements shown in FIG. 8, are performed in cooperation with one or more hardware devices of the terminal 10 that are shown in FIG. 5. More specifically, these elements shown in FIG. 8 correspond to a plurality of functions or functional modules, which are executed according to an instruction of the CPU 101 (FIG. 5) that is generated according to the communication application 1031, 1032, 1033, or 1034 being loaded from the flash memory 104 onto the RAM 103.

The data transmitter/receiver 21, which may be implemented by the network I/F 111 under control of the CPU 101 (FIG. 5), transmits or receives various data or information to or from another communication terminal, device, or system, through the communications network 2.

The activator 22, which may be implemented by the instructions received from the CPU 101 (FIG. 5), activates the communication application 1031, 1032, 1033, or 1034 that functions as the communication controller 1060 in response to an activation request received at the operation input 12 of the device controller 1050. The operation input 12 generates the activation request, in response to a user selection that selects the communication application.

The generator 23, which may be implemented by the instructions received from the CPU 101 (FIG. 5), generates a contact list screen, for example, by adding counterpart terminal state information and visual information of the counterpart terminal, to the contact list frame data.

The display control 24, which may be implemented by the display 1/117 according to the instructions from the CPU 101, controls transmission of the candidate (contact) list data generated by the generator 23.

The function executer 25, which may be implemented by one or more devices such as the camera 112, microphone 114, or speaker 115, under control of the CPU 101 (FIG. 5), controls processing of image data or sound data to be transmitted or received to or from the counterpart terminal 10.

The memory control 29, which may be implemented by the instructions received from the CPU 101 that may operate in cooperation with the SSD 105, stores or reads various data with respect to the memory 1000.

<Functional Structure of Management System>

Still referring to FIG. 8, a functional structure of the communication management system 50 is explained. The communication management system 50 includes a data transmitter/receiver 51, an authenticator 52, a state manager (manager) 53, and a memory control 59. These elements shown in FIG. 8 correspond to a plurality of functions or functional modules, which are executed according to an instruction of the CPU 201 (FIG. 6) that is generated according to the communication management program being loaded from the HD 204 onto the RAM 203. The communication management system 50 further includes a memory 5000, which may be implemented by, for example, the HD 204 (FIG. 6). The memory 5000 stores therein a terminal authentication management DB 5001, a terminal state management DB 5002, an application use permission management DB 5003, and an application image management DB 5004. The memory 5000 further includes various data such as candidate (contact) list frame data as one example of execution image data, or various application icons.

FIG. 10 illustrates an example data structure of a terminal authentication management table, which is one example of the terminal authentication management DB 5001. The terminal authentication management table stores a terminal identification (ID) for identifying the communication terminal 10, and a password assigned for the communication terminal 10, in association with each other. The terminal ID may be previously stored in a memory of the communication terminal 10, or may be stored according to a user input to the communication terminal 10. For example, the terminal authentication management table of FIG. 10 indicates that the terminal ID "01aa" is stored in association with the password "aaaa" for the terminal 10*aa*.

FIG. 11 illustrates an example data structure of a terminal state management table, which is one example of the terminal state management DB 5002. The terminal state management table stores, for each of the terminal IDs of the communication terminals 10, a terminal name, an operation state of the terminal 10, the date/time at which a login request is received at the communication management system 50 from the terminal 10, and a terminal IP address assigned to the terminal 10. The operation state indicates, for example, whether the communication terminal is online or offline. The "online" operation state further indicates whether the communication terminal is available for communication ("communication OK"), the communication terminal is interrupted from communication ("interrupted"), or the communication terminal is currently communicating with the counterpart terminal ("communicating").

For example, for the terminal 10*aa* having the terminal ID "01aa", the terminal state management table of FIG. 11 indicates that the terminal name is "China Beijing Office AA terminal", the operation state is online ("ONLINE") and is available for communication ("COMMUNICATION OK"), the received date and time is "13:40 PM, Nov. 10, 2012", and the IP address of the terminal 10*aa* is "1.2.1.3". The management system 50 stores various information regarding the terminal 10, such as the terminal ID, the terminal type, or the terminal name, when the terminal 10 is registered to the communication system 1 for management by the management system 50. Such information may be updated or modified, for example, according to a user instruction received from any one of the terminals 10.

(Application Use Permission Management Table)

FIG. 12 illustrates an example data structure of an application use permission management table (application use management table), which is one example of the application use permission management DB 5003, stored in the memory 5000. The application use permission management table stores, for the terminal ID that identifies each one of the terminals 10 managed by the management system 50, an application ID that identifies each one of a plurality of applications installed on the terminal 10, and use permission information indicating whether use of the application is allowed ("ON") or not allowed ("OFF") by the terminal 10. For example, the application use permission management table of FIG. 12 indicates that, for each one of the terminals 10*aa*, 10*ab*, and 10*ac*, four applications respectively having the application IDs "a001", "a002", "a003", and "a004" are installed. For the terminal 10*aa* with the terminal ID "01as", all applications with the application IDs "a001", "a002", "a003", and "a004" are allowed for use by the terminal 10*aa*. For the terminal 10*ab* with the terminal ID "01ab", applications with the application IDs "a001", "a002", and "a003" are allowed for use by the terminal 10*ab*. For the terminal 10*ac* with the terminal ID "01ac", applications with the application IDs "a001", "a002", and "a004" are allowed for use by the terminal 10*ac*.

In this example, the contents of the application use management table do not have to be fixed, such that the contents can be modified according to application that are installed onto the terminal 10. For example, a record of the application use management table such as an application ID may be added or deleted, according to addition or deletion of application currently installed onto the terminal 10. In such case, the user at a terminal, such as a personal computer, may access the communication management system 50 to modify the contents of the application use management table stored in the memory 5000.

FIG. 13 illustrates an application image management table, which is one example of the application image management DB 5004 stored in the memory 5000. The application image management table stores, for each one of the plurality of application IDs being managed by the management system 50, first address information and second address information in association with each other. In this example, the first address information is an URL on the communications network 2 indicating the location where application icon data is stored. The application icon data is one example of first visual information reflecting the application. The second address information is an URL on the communications network 2 indicating the location where execution image data of the application is stored, which is to be displayed when the application is executed. The applications that are managed by the management 50 include a collection of a plurality of applications that are installed onto the terminals 10 being managed by the management system 50. In this example, it is assumed that the applications "a001", "a002", "a003", and "a004" are installed on the communication terminals 10 managed by the management system 50.

In addition to the first address information such as the URL indicating the location where the application icon data is stored, the application image management table of FIG. 13 may store third address information such as the URL indicating the location where programs or data files to be used in executing that application are stored, in association with the application ID that identifies that application. For example, the third address information may indicate any location on the program providing system 90 where such programs or data files are stored. Upon execution of a specific application, the terminal 10 accesses a storage area indicated by the third address information to obtain programs or data files to be used in executing the specific application from the program providing system 90.

FIG. 14 is an example data structure of a candidate list management table, which is one example of the candidate list management DB 5005 stored in the memory 5000. The candidate list management table stores, for each one of a plurality of request terminals 10 capable of requesting for communication such as videoconference communication, the terminal ID of the request terminal 10, and one or more terminal IDs that are respectively assigned to candidate counterpart terminals 10 that are previously registered for the request terminal 10. In this example, for the request terminal 10, one or more terminals 10 of the communication system 1 of FIG. 1 are previously registered as the candidate counterpart terminal 10. For example, the candidate list management table of FIG. 14 indicates that the request terminal 10*aa* having the terminal ID "01aa" is most likely to request for videoconference with respect to the terminal 10*ab* having the terminal ID "01ab", the terminal 10*ba* having the terminal ID "01ba", the terminal 10*bb* having the terminal ID "01bb", etc. The management system 50 manages the candidate list management table of FIG. 14, for example, according to a user instruction received from any one of the terminals 10. For example, in response to a user instruction received from the terminal 10*aa*, the management system 50 may add or delete the contents of the candidate list management table.

(Functional Structure of Management System)

Referring back to FIG. 8, a functional structure of the communication management system 50 is explained.

The data transmitter/receiver 51, which may be implemented by the network I/F 209 (FIG. 6) according to an instruction received from the CPU 201, transmits or receives various data or information to or from another terminal, device, or system through the communications network 2.

The authenticator 52, which may be implemented by the instructions of the CPU 201 (FIG. 6), uses a terminal ID and a password that are obtained at the data transmitter/receiver 51 as a search key, to search the terminal authentication management table of FIG. 10, and determine whether the obtained set of the terminal ID and password is registered. Based on the search result, the terminal authenticator 52 determines whether the user at the terminal 10 or the terminal 10 is allowed for access.

The manager 53, which operates according to the instructions of the CPU 201 (FIG. 6), manages the operation state of the terminal 10 using the terminal state management table of FIG. 11. More specifically, the manager 53 stores the terminal ID of the terminal 10, the operation state of the terminal 10, the date and time at which the management system 50 receives the login request information from the terminal 10, and the IP address of the terminal.

The memory control 59, which may be implemented by the instructions of the CPU 201 (FIG. 6), which may operate with the HDD 205, writes or reads various data with respect to the memory 5000.

<Operation>

Figure 15:
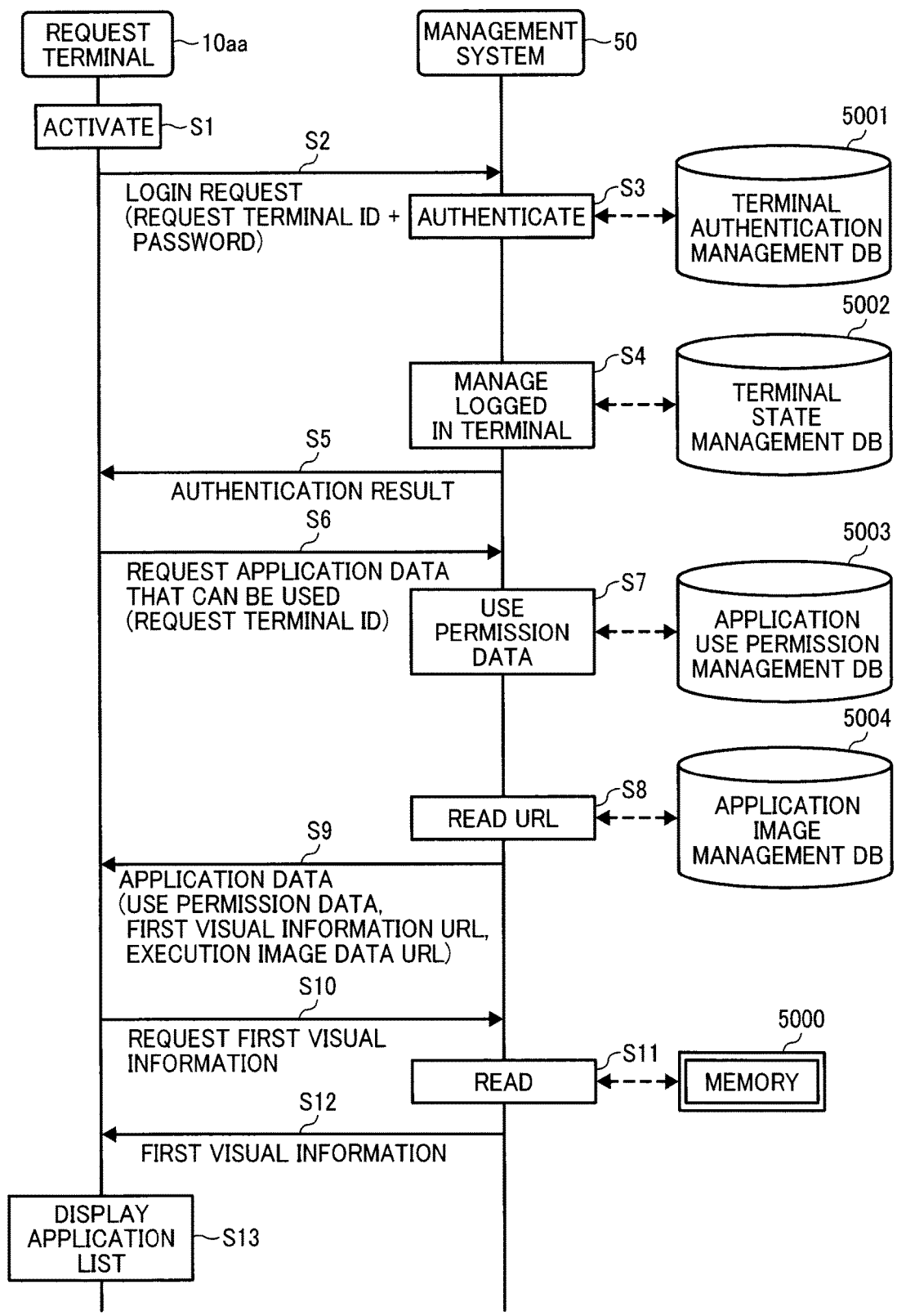
FIG. 15 is an example data sequence diagram illustrating operation of displaying information regarding one or more communication applications that are allowed for use by the communication terminal, in response to activation of the communication terminal, performed by the communication system of FIG. 1, according to an example embodiment of the present invention.

Referring to FIGS. 15 to 19, operation of preparing for starting communication is explained, according to an example embodiment of the present invention. FIG. 15 is a data sequence diagram illustrating operation of displaying information indicating one or more applications that are allowed for use by the request terminal 10*aa*, after the request terminal 10*aa* is activated. In FIGS. 15 and 16, various management data are transmitted or received through the management data session "sei" illustrated in FIG. 2.

As the user turns on the power switch 109 (FIG. 4), at S1, the operation input 12 (FIG. 8) of the request terminal 10*aa* receives a user instruction for turning on the power, and the request terminal 10*aa* is activated.

At S2, as the power is turned on, the data transmitter/receiver 11 of the request terminal 10*aa* sends login request information to the communication management system 50 through the communications network 2. The data transmitter/receiver 51 of the management system 50 receives the login request information. In alternative to the time at which the power is turned on, the login request information may be transmitted according to a user instruction for logging in.

The login request information includes the terminal ID that identifies the request terminal 10*aa*, and the password associated with the terminal ID of the request terminal 10*aa*. More specifically, the memory control 19 reads out a set of the terminal ID and the password from the memory 1000, and transmits the set of the terminal ID and the password to the data transmitter/receiver 11 to send such information as the login request information. Alternatively, the request terminal 10*aa* may obtain the terminal ID and the password from a user input, and includes the obtained terminal ID and password in the login request information to be transmitted to the management system 50. With the login request information, the management system 50 receives the IP address of the request terminal 10*aa* that sends the login request information.

At S3, the terminal authenticator 52 of the management system 50 searches the terminal authentication management table (FIG. 10) stored in the memory 5000 using the terminal ID and the password of the login request information received through the data transmitter/receiver 51. When it is determined that the terminal ID and the password of the login request information is stored in the terminal authentication management table of FIG. 10, the terminal authenticator 52 determines that the terminal 10*aa* is a registered terminal that is authorized to use the communication system 1.

At S4, when the terminal authenticator 52 determines that the login request information is received from the authorized terminal 10, the manager 53 of the management system 50 stores the operation state, the date and time at which the login request information is received, and the IP address of the terminal 10*aa*, with respect to the terminal ID and the terminal name of the terminal 10*aa* in the terminal state management table (FIG. 11) to create a record of the terminal 10*aa*. Using the terminal state management table of FIG. 11, which stores the operations state of online (communication OK), the date and time of "13:40, 11/10/2012", and the terminal IP address of "1.2.1.3" in association with the terminal ID "01aa", various information regarding the terminal 10*aa* can be managed.

At S5, the data transmitter/receiver 51 of the management system 50 sends the authentication result obtained by the terminal authenticator 52 to the request terminal 10*aa* that has sent the login request information through the communication network 2. As described above, in this example, it is assumed that the terminal authenticator 52 determines that the terminal 10*aa* is an authorized terminal. The data transmitter/receiver 11 of the request terminal 10*aa* receives the authentication result.

When the request terminal 10*aa* receives the authorization result indicating that the terminal 10*aa* is the authenticated terminal, at S6, the data transmitter/receiver 11 of the request terminal 10*aa* sends a request for information regarding one or more applications that are allowed for use by the request terminal 10*aa* ("application data request information"), to the management system 50 through the communications network 2. The data transmitter/receiver 51 of the management system 50 receives the application data request information. The application data request information includes the terminal ID of the request terminal 10*aa*.

At S7, the memory control 59 of the management system 50 searches the application use permission management table of FIG. 12, using the terminal ID of the request terminal 10*aa* that is received at S6 as a search key, to obtain information regarding one or more applications that are allowed for use by the request terminal 10*aa*. More specifically, the memory control 59 obtains, for each one of one or more applications that are installed in the request terminal 10*aa*, use permission information indicating whether the application is allowed or not allowed for use by the request terminal 10*aa*. In this example, the use permission information for the request terminal 10*aa* indicates that the application with the application ID "a001" is "ON", the application with the application ID "a002" is "ON", the application with the application ID "a003" is "ON", and the application with the application ID "a004" is "ON".

The memory control 59 extracts the "ON" use permission information, out of the use permission information read at S7, to identify one or more application IDs each identifying the application having the "ON" use permission information.

At S8, using the application IDs having the "ON" use permission information as a search key, the memory control 59 searches the application image management table of FIG. 13 to obtain, for each application that is allowed for use by the request terminal 10, the URL of the first visual information and the URL of the execution image data.

At S9, the data transmitter/receiver 51 of the management system 50 transmits information regarding one or more applications that are allowed for use ("application data"), to the request terminal 10aa through the communications network 2. The application data includes the use permission information obtained at S7, and the URL of the first visual information and the URL of the execution image data that are obtained at S8. More specifically, the use permission information indicates, together with the application identification information, information indicating whether the application is allowed for use for each one of the applications that are installed at the terminal 10, as described above. For example, referring to FIG. 12, such information regarding one or more applications that are allowed for use by the request terminal 10aa may include a record of the application use management table for the request terminal 10aa, that is, association information that associates the application ID and the use permission information "ON" or "OFF". Alternatively, the application data may be sent only for the applications that are allowed for use by the request terminal 10aa. In such case, the application ID of each one of the application that is allowed for use may be transmitted.

The application data, which is transmitted at S9, may further include the third address information such as the URL information indicating the location where programs or data files to be used in executing a specific application, for each one of the one or more applications that are allowed for use. The programs to be used in executing the specific application not only include programs to be used together with the specific application, but may also include the specific application that is allowed for use. The data transmitter/receiver 11 of the request terminal 10aa receives the application data regarding one or more applications that are allowed for use, and stores the application data at least temporarily in a memory. When storing, each data may be managed in association with the application ID.

At S10, the data transmitter/receiver 11 of the request terminal 10aa sends a request for accessing the URL of the first visual information that is received at S9, to request for the first visual information of each one of the applications that are allowed for use. The management system 50 receives the request for the first visual information of the application, at the data transmitter/receiver 51. This first visual information is requested only for the application having the "ON" use permission information.

At S11, the memory control 59 of the management system 50 reads out the first visual information for the application that is allowed for use, which is requested at S10, from the memory 5000.

At S12, the data transmitter/receiver 51 of the management system 50 transmits the first visual information as requested, to the request terminal 10aa through the communications network 2. The data transmitter/receiver 11 of the request terminal 10aa receives the first visual information.

At S13, the display control 13 of the request terminal 10aa displays an application list screen, such as an application list screen 140 as illustrated in FIG. 17, on the display 120aa. The application list screen 140 displays, for each one of a plurality of applications that are allowed for use, an icon that reflects the application having the "ON" use permission information, based on the first visual information received from the management system 50. The first visual information is the application icon data that reflects the application. In this example, four application icons 141, 142, 143, and 144, which correspond to the application IDs "a001", "a002", "a003", and "a004", respectively, are displayed. With the icon, the terminal name or any other information that can be used to identify the application may be displayed.

Figure 16A:
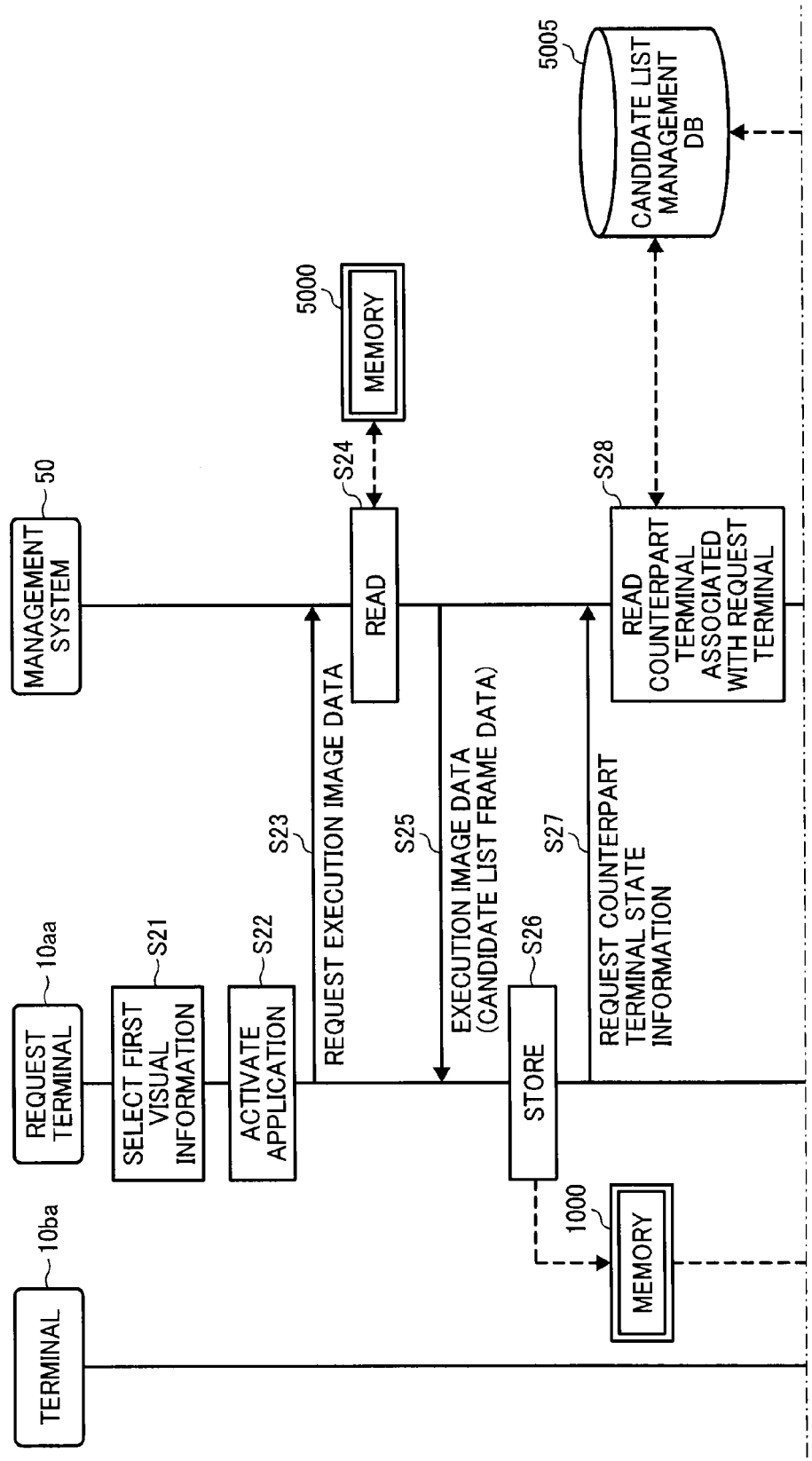
FIGS. 16A and 16B are an example data sequence diagram illustrating operation of sending candidate counterpart terminal state information regarding one or more candidate counterpart terminals, in response to selection of the application at the communication terminal, performed by the communication system of FIG. 1, according to an example embodiment of the present invention.
Figure 16B:
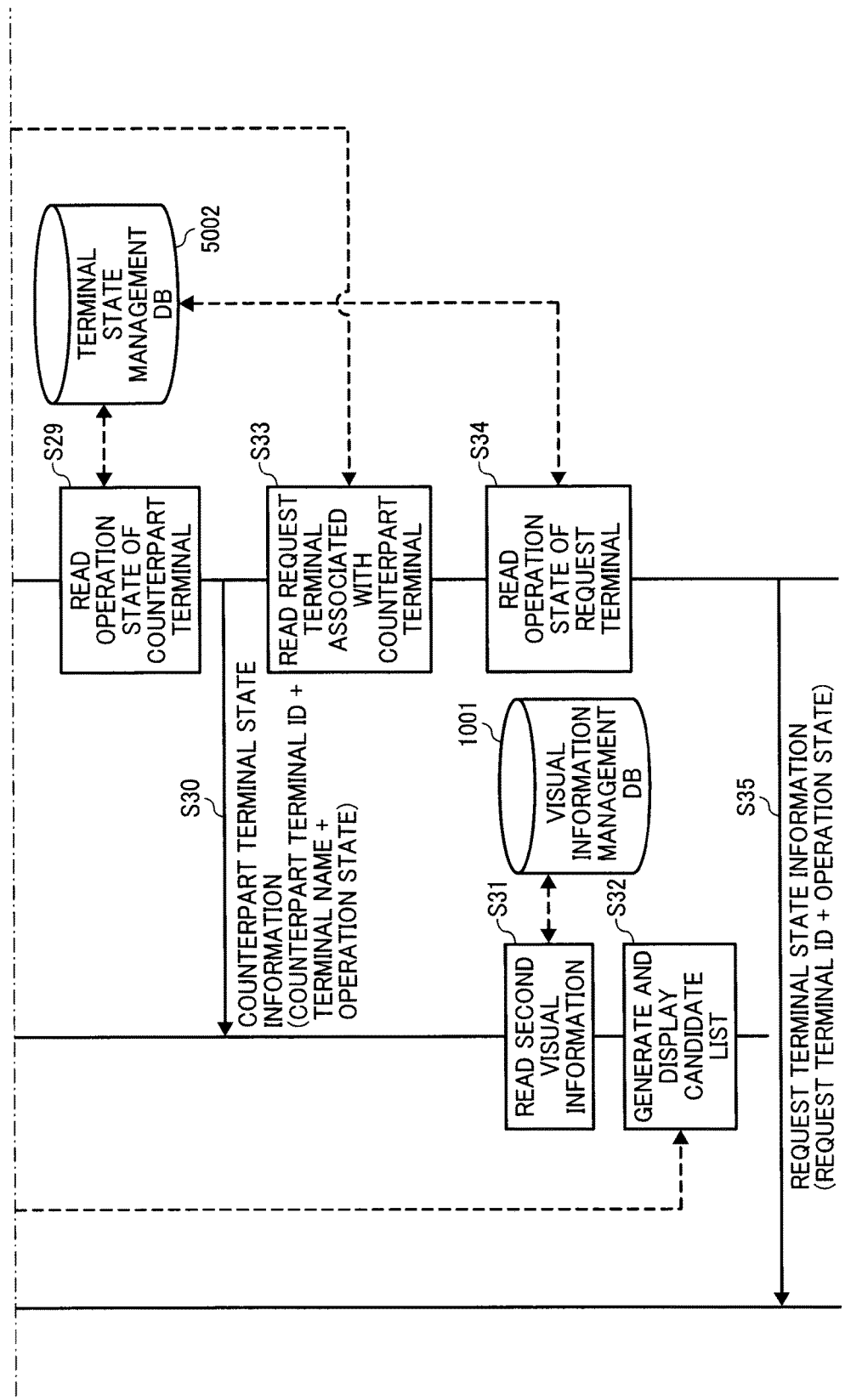

FIGS. 16A and 16B are a data sequence diagram illustrating operation of displaying counterpart terminal state information, using execution image data of one of the applications that is selected at the request terminal 10aa, according to an example embodiment of the present invention.

As the user selects a specific icon from the application icons 141 to 144 that are displayed on the application list screen of FIG. 17, for example, through operating the operation key 108 (FIG. 5), at S21, the operation input 12 of the request terminal 10aa receives a user instruction for activating a specific application associated with the selected application icon. For example, the operation input 12 obtains the application ID, which is associated with the selected icon, using the application data that is stored in the memory. Alternatively, the operation input 12 may receive the application ID, together with selection of the specific icon, from the request terminal 10aa, for example, when the application icon is embedded with the application ID.

At S22, the operation input 12 of the device controller 1050 (FIG. 8) of the request terminal 10aa identifies a specific application that is selected using the obtained application ID, and instructs the selected application to be activated. When the terminal 10 receives the third address information such as the URL information indicating the location where the programs or data files to be used with the specific application is received at S9 (FIG. 15) and stored in a memory of the terminal 10, the operation input 12 requests the data transmitter/receiver 11 to obtain the programs or data files using the third address information, before executing the specific application. When the programs or data files are obtained, the operation input 12 requests the activator 22 to activate the specific application using any one of the programs or data files. In case the specific application to be executed is obtained before activating that application, the specific application is installed onto the memory of the terminal 10. As long as the application to be executed is installed onto the terminal 10, the application to be executed does not have to be pre-installed before being shipped.

In this example, it is assumed that the user selects the icon 141 from the application list screen 140 of FIG. 17, which corresponds to the communication application 1031 of FIG. 7 with the application ID "a001". In such case, the operation input 12 sends an activation request to the activator 22 of the selected communication application 1031 to request activation of the communication application 1031. When executed, the communication application 1031 operates as the communication controller 1060 of the request terminal 10aa.

S21 to S22 are thus performed by the OS, which operates as the device controller 1050 of the request terminal 10aa. S23 to S35 are performed by the communication controller 1060, which is activated at S22 in response to the activation request received from the device controller 1050.

At S23, the data transmitter/receiver 21 of the communication controller 1060 of the request terminal 10aa sends a request for accessing the URL of the execution image data, which is associated with the selected application that is now activated at S22, to request for execution image data. The URL of the execution image data is read out from the memory, using the application ID of the selected application. The data transmitter/receiver 51 of the management system 50 receives the execution image data request.

At S24, the memory control 59 of the management system 50 reads out the execution image data, using the URL obtained at S23, from the memory 5000.

Figure 18:
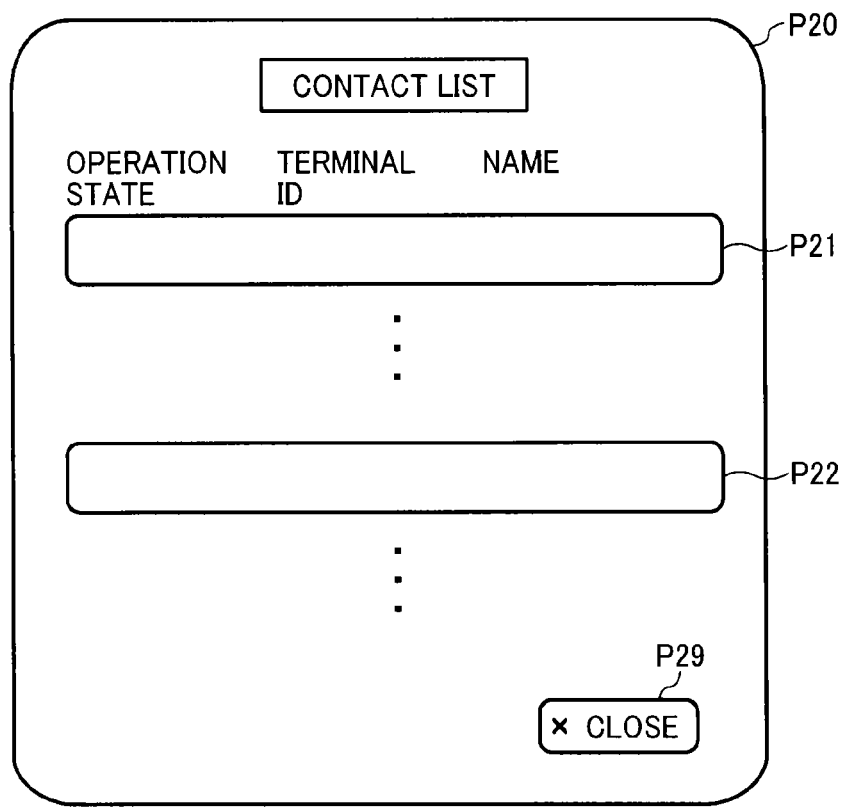
FIG. 18 is an illustration of an example image of contact list frame data.

At S25, data transmitter/receiver 51 of the management system 50 transmits the execution image data to the request terminal 10aa through the communications network 2. The request terminal 10aa receives the execution image data at the data transmitter/receiver 21. FIG. 18 illustrates an image of contact list frame data, which is one example of an image of the execution image data. As illustrated in FIG. 18, the contact list P20 includes, for each one of candidate counterpart terminals 10, a frame (P21, P22, etc.) that displays therein candidate counterpart terminal information. The candidate counterpart terminal information includes, for example, visual information that reflects the operation state of the candidate counterpart terminal, the terminal ID of the candidate counterpart terminal, and the terminal name of the candidate counterpart terminal. At the lower right of the contact list P20, a "close" key is provided, which, when selected, closes the contact list P20.

At S26, the memory control 29 stores the execution image data in the memory 1000 at least temporarily, which is received at S25.

At S27, the data transmitter/receiver 21 requests for counterpart terminal state information to the management system 50 through the communications network 2. The data transmitter/receiver 51 of the management system 50 receives the counterpart terminal state information request. The counterpart terminal state information request includes, for example, the terminal ID of the request terminal 10aa.

At S28, the memory control 59 of the management system 50 searches the candidate list management table of FIG. 14 using the terminal ID of the request terminal 10aa, which is received at S27, as a search key to obtain the terminal ID of one or more candidate counterpart terminals capable of communicating with the request terminal 10aa. For simplicity, in this example, it is assumed that the terminal IDs "01ba" and "01db" are obtained as the terminal IDs of the candidate counterpart terminals 10ba and 10db that are associated with the terminal ID "01aa" of the request terminal 10aa.

At S29, the memory control 59 searches the terminal state management table of FIG. 11 using the terminal IDs "01ba" and "01db", which are obtained at S28, as a search key to obtain the terminal names and the operation states for the terminals 10ba and 10db.

At S30, the data transmitter/receiver 51 of the management system 50 sends the counterpart terminal state information to the request terminal 10aa through the communications network 2. The request terminal 10aa receives the counterpart terminal state information at the data transmitter/receiver 21. The counterpart terminal state information includes the terminal ID of the candidate counterpart terminal, which is used as a search key at S29, the terminal name of the candidate counterpart terminal, and the operation state of the candidate counterpart terminal. With this information, the request terminal 10aa is able to know the operation state of each one of the terminals 10ba and 10db, which are capable of communicating with the request terminal 10aa.

At S31, the memory control 29 of the request terminal 10aa searches the visual information management table of FIG. 9 stored in the memory 1000 using the operation state information obtained at S30 as a search key, to obtain visual information associated with the obtained operation state for each one of the counterpart terminal IDs that are received at S30.

At S32, the generator 23 reads out the contact list frame data, which is temporarily stored in the memory 1000 as one example of execution image data. The generator 23 adds the terminal ID and the terminal name that are obtained at S30, and the visual information obtained at S31, to the contact list frame data to create an image of contact list P20 as illustrated in FIG. 19. FIG. 19 illustrates an example contact list screen, which displays, on each one of the frames P21, P22, etc., visual information reflecting the operation state, the terminal ID, and the terminal name, for each one of one or more candidate counterpart terminals obtained for the request terminal 10aa. The display control 24 displays the contact list screen on the display 120, as the candidate (contact) list.

When the user at the request terminal 10aa selects a desired counterpart terminal, from the contact list screen, the request terminal 10aa starts communication with the selected counterpart terminal under control of the function executer 25.

At S33, the memory control 59 of the management system 50 searches the candidate list management table of FIG. 14 using the terminal ID "01aa" of the request terminal 10aa that has sent the login request information as a search key, to obtain the terminal ID of the request terminal 10 that has registered the terminal 10aa having the terminal ID "01aa" as a candidate counterpart terminal. For simplicity, in this example, it is assumed that the memory control 59 reads the terminal IDs "01ba" and "01db" of the request terminals 10 associated with the terminal 10aa.

At S34, the memory control 59 searches the terminal state management table of FIG. 11 using the terminal ID "01aa" of the request terminal 10aa that has sent the login request information as a search key, to obtain the operation state of the request terminal 10aa.

At S35, the data transmitter/receiver 51 of the management system 50 determines whether the terminals 10ba and 10db each have the "online" operation state, by referring to the terminal state management table of FIG. 11. The data transmitter/receiver 51 sends the terminal ID "01aa" and the state "online (communication OK)" of the request terminal 10aa, to the terminal 10ba having the "online" state.

When the data transmitter/receiver 51 transmits the state information of the request terminal 10aa ("request terminal state information"), as the counterpart terminal state information for the terminal 10ba, the data transmitter/receiver 51 refers to the terminal state management table of FIG. 11 to obtain the IP address of the terminal 10ba using the terminal ID "01ba". Using the IP address of the terminal 10ba, the management system 50 sends the terminal ID "01aa" and the operation state "online" of the request terminal 10aa that has sent the login request information, to the terminal 10ba having the terminal ID "01db" that is associated with the terminal ID "01aa" in the candidate list management table of FIG. 14.

The above-described S2 to S35 are performed for any other terminal 10, as the power switch 109 is turned on.

As described above, in the above-described embodiment, the terminal 10 is previously installed with a plurality of communication applications, before the terminal 10 is shipped to the user's site. With this configuration, the user at the terminal 10 does not have to download or install a communication application, which could be time-consuming. Especially when the terminal 10 is implemented by the videoconference system as illustrated in FIG. 4, it may be difficult for the user to input various instructions through the operation key 108, which is simple compared to the keyboard or ten-key. If the terminal 10 is previously installed with communication applications, irrespective of whether the user at the terminal 10 actually uses, the user does not have to download or install the communication applications.

However, it is almost impossible to know beforehand, which one of the plurality of communication applications each terminal 10 needs, as information indicating whether which one of the communication applications is allowed or not allowed for use by the terminal 10 depends on a type of services that the user (owner) of the terminal 10 chooses.

In view of this, the management system 50 stores, for each one of a plurality of terminals 10, use permission information indicating whether each one of a plurality of applications installed on the terminal 10 is allowed for use by the terminal 10. In response to a request including the terminal ID of the terminal 10, the management system 50 sends the use permission information specific to the terminal 10, to the terminal 10. Based on the use permission information, the terminal 10 activates one or more of the plurality of applications, each of which is allowed for use by the terminal 10. Since the use permission information can be centrally managed at the management system 50, the terminal 10 is able to display information regarding one or more communication applications that are allowed for use, which is constantly updated.

Further, even when one or more of the applications installed onto the terminal 10 needs to be updated, information regarding the applications that are allowed for use by the terminal 10 can be modified to reflect the updated applications. With this information, the terminal 10 is able to download the applications that are allowed for use by the terminal 10, and install the applications that are allowed for use by the terminal 10.

Further, the user at the terminal 10 may choose to download any application from the communications network 2 to newly install onto the terminal 10. Even in such case, the communication management system 50 may centrally manage such information indicating which one of the applications that can be installed onto the communication management system 50 is allowed for use by the terminal 10. With this information, the terminal 10 is able to download the applications that are allowed for use by the terminal 10, and install the applications that are allowed for use by the terminal 10.

In another example, the management system 50 further manages the URL of the first visual information and the URL of the execution image data, for each one of the communication applications. The management system 50 sends the URL of the first visual information and the URL of the execution image data to the terminal 10, in addition to the information indicating one or more applications that are allowed for use by the terminal 10. The terminal 10 sends a request for the first visual information, or a request for the execution image data, to the management system 50, using the URL data, to obtain the first visual information or the execution image data. With this configuration, the terminal 10 does not have to store, in its memory, the first visual information or the execution image data, even though a plurality of communication applications is installed at the terminal 10. Since such data is centrally managed at the management system 50, the terminal 10 is able to obtain the most updated data easily from the management system 50.

Referring now to FIG. 20, an example embodiment of the present invention is explained.

In the above-described embodiment, as illustrated in FIG. 12, the application use permission management table stores the use permission information "ON" or "OFF", for each one of a plurality of communication applications installed at the terminal 10. In this embodiment, as illustrated in FIG. 20, when the communication application is allowed for use by the terminal, the use permission information may additionally include time information indicating a time period in which the application is allowed for use. In this example of FIG. 20, for the application with the application ID "a003" that is allowed for use by the terminal 10aa, the use is allowed from Jan. 1, 2012 to Sep. 30, 2012. For the other time period, the use of application is not allowed.

More specifically, referring to S8 of FIG. 15, the memory control 59 obtains the current date/time, such as the received date/time when the request for information regarding one or more applications that are allowed for use is received at the management system 50. The memory control 59 searches the application image management table (FIG. 13) using the application ID having the "ON" use permission information for the received date/time, to obtain the URL of the first visual information and the URL of the execution image data that are associated with the application ID. More specifically, it is determined whether the received date/time falls within the time period that is set by the use permission information of the application.

In this example embodiment, only the communication applications that are allowed for use may be set in terms of a time period, for example, based on a time period set by a contract or the actual payment by the user.

In the above-described example embodiments, it is assumed that the communication management system 50 manages information regarding a plurality of communication applications that are previously installed onto each one of a plurality of communication terminals 10 subject for management by the management system 50. Alternatively or additionally, the communication management system 50 may manage information regarding any other type of application that may be previously installed or may be later installed onto each one of a plurality of communication terminals 10 subject for management by the management system 50.

In the above-described example embodiments, the relay device 30, the management system 50, the program providing system 90, and the maintenance system 100 may each be implemented by a single computer. Alternatively, any number of parts, functions, or modules of the relay device 30, the management system 50, the program providing system 90, and the maintenance system 100 may be classified into a desired number of groups to be carried out by a plurality of computers. In case the program providing system 90 is implemented by the single computer, the program to be provided by the program providing system 90 may be transmitted, one module by one module, after dividing into a plurality of modules, or may be transmitted at once. In case the program providing system 90 is implemented as a plurality of computers, each computer may transmit each module that is stored in its memory, after the program is divided into a plurality of modules.

A recording medium storing any one of the terminal control program, relay control program, and communication management program, or a storage device such as the HDD 204 that stores any one of the terminal control program, relay control program, and communication management program, or the program providing system 90 provided with the HD 204 storing any one of the terminal control program, relay control program, and communication management program, may be distributed within the country or to another country as a computer program product.

In this example, any identification information such as any one of the terminal ID of the terminal 10, the relay device ID of the relay device 30, and the application ID, includes any type of identification information that can be expressed by any language, character, symbol, mark, or any combination of language, character, symbol, and mark.

For example, the application ID is one example of application identification information that identifies each application. The other examples of application identification information include, but not limited to, an application name. In another example, the terminal ID is one example of terminal identification information that identifies each terminal. The other examples of terminal identification information include, but not limited to, a manufacture number, and a user ID that is assigned to the user of the terminal 10.

The icons illustrated in FIGS. 9 and 17 may include a character, symbol, picture, or any combination of these, or any other graphical image.

Further, the date and time information stored in the terminal state management table of FIG. 11 is expressed in terms of date and time. Alternatively, the date and time information may be expressed only in terms of time such as the time at which information is received.

Further, in the above-described examples, the IP address of the terminal 10 is stored as illustrated in FIG. 11. In alternative to the IP address, the location information of the terminal 10 may be managed using Fully Qualified Domain Name (FQDN). In such case, the communication system 1 is provided with a domain name system (DNS) server that obtains the IP address that corresponds to the FQDN of the terminal 10.

In the above-described examples, the communication system 1 of FIG. 1 is treated as a videoconference system. Alternatively, the communication system 1 of FIG. 1 may be implemented as a teleconference system such as the IP teleconference system or the Internet teleconference system, or a computer system. Alternatively, the communication system 1 of FIG. 1 may be implemented as a car navigation system. For example, the request terminal 10 may be implemented as a car navigation system that is installed onto an automobile. The counterpart terminal 10 may be implemented as a management terminal or server at a management center that manages the car navigation system or a car navigation system that is installed onto another automobile. In another example, the communication system 1 of FIG. 1 may be implemented as a communication system having a portable phone, smart phone, tablet, game machine, etc. In such case, the terminal 10 may be implemented as the portable phone, smart phone, tablet, game machine, etc.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In one example, the present invention may reside in: a communication terminal including: a storage area that stores a plurality of applications each of which is executable; a transmitter that transmits a request for application information indicating one or more of the plurality of applications that are allowed for use by the communication terminal, to a communication management system through the communications network, the request including terminal identification information that identifies the communication terminal; a receiver that receives the application information of the communication terminal from the communication management system, the application information being obtained by the communication management system using the terminal identification information; and a display that displays, for each one or more of the one or more of applications that are allowed for use by the communication terminal, visual information that reflects the application, based on the application information.

In the above-describe example, the communication terminal may further include: a user interface that receives a user instruction for selecting one of the one or more applications that are allowed for use by the communication terminal; and an activator that activates the application that is selected by the user instruction.

What is claimed is:

1. A communication management system, comprising:
   a memory that stores, for each one of a plurality of communication terminals managed by the communication management system, terminal identification information that identifies the communication terminal, application identification information that identifies each one of a plurality of applications that are installed onto the communication terminal, and use permission information indicating whether each application of the plurality of applications is allowed or not allowed for use by the communication terminal, in association with each other;
   a receiver that receives terminal identification information that identifies a request communication terminal through a communications network, the request communication terminal being one of the plurality of communication terminals managed by the communication management system;
   circuitry that obtains application information indicating one or more applications that are allowed for use by the request communication terminal, using the received terminal identification information of the request communication terminal; and
   a transmitter that transmits the application information of the request communication terminal to the request communication terminal through the communications network, wherein
   the transmitter transmits first address information and second address information to the request communication terminal, the first address information and the second address information each associated with the one or more applications that are allowed for use by the request communication terminal, from among a plurality of applications that are installed onto the request communication terminal,
   wherein the request communication terminal is configured to display, based on the first address information and the second address information, only the one or more applications that are allowed for use by the request communication terminal from among the plurality of applications that are installed onto the request communication terminal.

2. The communication management system of claim 1, wherein the application information includes:
   use permission information indicating whether the application installed onto the request communication terminal is allowed or not allowed, which is associated with the application identification information of each one of the plurality of applications that is installed onto the request communication terminal.

3. The communication management system of claim 2, wherein the circuitry further determines one or more applications of the plurality of applications that are associated with the use permission information indicating that use of the application is allowed by the request communication terminal, as the one or more applications that are allowed for use by the request communication terminal, and
   obtains the application identification information of each one of the one or more applications that are allowed for use by the request communication terminal.

4. The communication management system of claim 3, further comprising:
   a second memory that stores, for each one of a plurality of applications that are managed by the communication management system, application identification information that identifies the application, the first address information indicating a location on the communications network where visual information that reflects the application is stored, and the second address information indicating a location on the communications network where execution image data is stored, in association with each other, wherein
   the circuitry obtains the first address information and the second address information that are stored in association with the obtained application identification information of each one of the one or more applications that are allowed for use by the request communication terminal.

5. The communication management system of claim 3, wherein the second memory further stores time information indicating a time period during which the application is allowed for use by the communication terminal, in association with the use permission information indicating that use of the application is allowed by the request communication terminal, and
   the circuitry obtains current time information indicating the received time at which the identification information of the request communication terminal is received at the communication management system, and determines the one or more applications that are allowed for use by the request communication terminal, based on determination of whether the received time falls in the time period indicated by the time information in addition to the use permission information.

6. The communication management system of claim 1, wherein the plurality of applications includes a plurality of communication applications each of which allows, when executed, the communication terminal to communicate with a counterpart communication terminal.

7. The communication management system of claim 6, wherein the plurality of communication applications control communication between the request communication terminal and the counterpart communication terminal using different communication protocols.

8. A communication system, comprising:
   the communication management system of claim 1; and
   the request communication terminal configured to communicate with the communication management system through the communications network, the communication terminal including:
   a second memory that stores the plurality of applications each of which is executable;
   a transmitter that transmits a request for application information indicating one or more of the plurality of applications that are allowed for use by the request communication terminal, to the communication management system through the communications network, the request including the terminal identification information of the request communication terminal;

a receiver that receives the application information of the request communication terminal from the communication management system; and a display that displays, for each one of the one or more of applications that are allowed for use by the request communication terminal, visual information that reflects the application, based on the application information.

9. The communication system of claim 8, wherein the request communication terminal further includes:

a user interface that receives a user instruction for selecting one of the one or more applications that are allowed for use by the request communication terminal; and an activator that activates the application that is selected by the user instruction.

10. A communication control method, comprising:

storing, in a memory, for each one of a plurality of communication terminals, terminal identification information that identifies the communication terminal, application identification information that identifies each one of a plurality of applications that are installed onto the communication terminal, and use permission information indicating whether each application of the plurality of applications is allowed or not allowed for use by the communication terminal, in association with each other;

receiving terminal identification information that identifies a request communication terminal through a communications network, the request communication terminal being one of the plurality of communication terminals;

obtaining application information indicating one or more applications that are allowed for use by the request communication terminal from the memory, using the received terminal identification information of the request communication terminal; and transmitting the application information of the request communication terminal to the request communication terminal through the communications network; and transmitting first address information and second address information to the request communication terminal, the first address information and the second address information each associated with the one or more applications that are allowed for use by the request communication terminal, from among a plurality of applications that are installed onto the request communication terminal, wherein the request communication terminal is configured to display, based on the first address information and the second address information, only the one or more applications that are allowed for use by the request communication terminal from among the plurality of applications that are installed onto the request communication terminal.

11. The communication control method of claim 10, wherein the application information includes:

use permission information indicating whether the application installed onto the request communication terminal is allowed or not allowed, which is associated with the application identification information of each one of the plurality of applications that is installed onto the request communication terminal.

12. The communication control method of claim 11, further comprising:

determining one or more applications of the plurality of applications that are associated with the use permission information indicating that use of the application is allowed by the request communication terminal, as the one or more applications that are allowed for use by the request communication terminal, and obtaining the application identification information of each one of the one or more applications that are allowed for use by the request communication terminal.

13. The communication control method of claim 12, further comprising:

storing, in a memory, for each one of a plurality of applications that are managed by the communication management system, application identification information that identifies the application, the first address information indicating a location on the communications network where visual information that reflects the application is stored, and the second address information indicating a location on the communications network where execution image data is stored, in association with each other; and obtaining the first address information and the second address information that are stored in association with the obtained application identification information of each one of the one or more applications that are allowed for use by the request communication terminal.

14. The communication control method of claim 13, further comprising:

storing time information indicating a time period during which the application is allowed for use by the communication terminal, in association with the use permission information indicating that use of the application is allowed by the request communication terminal;

obtaining current time information indicating the received time at which the identification information of the request communication terminal is received at the communication management system; and determining the one or more applications that are allowed for use by the request communication terminal, based on determination of whether the received time falls in the time period indicated by the time information in addition to the use permission information.

15. A non-transitory recording medium which, when executed by a processor, causes the processor to perform a communication control method, the method comprising:

storing, in a memory, for each one of a plurality of communication terminals, terminal identification information that identifies the communication terminal, application identification information that identifies each one of a plurality of applications that are installed onto the communication terminal, and use permission information indicating whether each application of the plurality of applications is allowed or not allowed for use by the communication terminal, in association with each other;

receiving terminal identification information that identifies a request communication terminal through a communications network, the request communication terminal being one of the plurality of communication terminals;

obtaining application information indicating one or more applications that are allowed for use by the request communication terminal from the memory, using the received terminal identification information of the request communication terminal;

transmitting the application information of the request communication terminal to the request communication terminal through the communications network; and transmitting first address information and second address information to the request communication terminal, the first address information and the second address information each associated with the one or more applications that are allowed for use by the request communication terminal, from among a plurality of applications that are installed onto the request communication terminal, wherein the request communication terminal is configured to display, based on the first address information and the second address information, only the one or more applications that are allowed for use by the request communication terminal from among the plurality of applications that are installed onto the request communication terminal.

\* \* \* \* \*